United States Patent
Kumar et al.

(10) Patent No.: US 11,546,860 B2
(45) Date of Patent: Jan. 3, 2023

(54) UPLINK-BASED POSITIONING

(71) Applicant: QUALCOMM Incorporated, San Diego, CA (US)

(72) Inventors: Akash Kumar, Hyderabad (IN); Amit Jain, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/101,023

(22) Filed: Nov. 23, 2020

(65) Prior Publication Data

US 2022/0167276 A1      May 26, 2022

(51) Int. Cl.
*H04W 52/14* (2009.01)
*H04W 52/28* (2009.01)
*H04W 52/16* (2009.01)
*H04W 52/36* (2009.01)
*H04W 64/00* (2009.01)

(52) U.S. Cl.
CPC ......... *H04W 52/146* (2013.01); *H04W 52/16* (2013.01); *H04W 52/28* (2013.01); *H04W 52/367* (2013.01); *H04W 64/003* (2013.01)

(58) Field of Classification Search
CPC ............. H04W 16/14; H04W 72/0473; H04W 64/003; H04W 72/0446; H04W 52/146; H04W 52/347; H04W 52/16; H04W 52/28; H04W 52/367; H04L 25/0226
USPC .......... 455/522, 69, 422.1, 67.11, 452.1, 509
See application file for complete search history.

(56) References Cited

U.S. PATENT DOCUMENTS

| | | | |
|---|---|---|---|
| 2011/0158117 A1* | 6/2011 | Ho | H04W 52/34 370/252 |
| 2017/0013565 A1* | 1/2017 | Pelletier | H04W 52/365 |
| 2020/0137819 A1* | 4/2020 | Shi | H04W 24/10 |
| 2020/0154449 A1 | 5/2020 | Akkarakaran et al. | |

(Continued)

OTHER PUBLICATIONS

Intel Corporation: "Design Aspects for NR UL Positioning", 3GPP Draft, R1-1902512 Intel—NR_UL_POS, 3rd Generation Partnership Project (3GPP), Mobile Competence Centre, 650, Route Des Lucioles, F-06921 Sophia-Antipolis Cedex, France, vol. RAN WG1, No. Athens, Greece, Feb. 25, 2019-Mar. 1, 2019, Feb. 16, 2019 (Feb. 16, 2019), XP051600208, 13 Pages, Retrieved from the Internet: URL: http://www.3gpp.org/ftp/tsg%5Fran/WG1%5FRL1/TSGR1%5F96/Docs/R1%2D1902512%2Ezip [Retrieved on Feb. 16, 2019] The Whole Document.

(Continued)

*Primary Examiner* — John J Lee
(74) *Attorney, Agent, or Firm* — Sunstein LLP

(57) ABSTRACT

A user equipment (UE) includes a processor configured to: send a first signal but not a second signal in response to the first and second signals being scheduled for concurrent transmission and available power for transmission of the first signal for the concurrent transmission being insufficient for detection of the first signal, the first signal being a first radio access technology (RAT) positioning reference signal; set a power sharing mode of the UE to a static power sharing mode; indicate that the UE is in a single-uplink operating mode with respect to the first RAT and the second RAT; and/or select a second-RAT TRP, for receiving the second signal, that has a maximum UE transmission power no greater than a threshold power in response to the initiation of the positioning session.

44 Claims, 11 Drawing Sheets

(56) References Cited

U.S. PATENT DOCUMENTS

2020/0236506 A1    7/2020  Kim
2020/0314729 A1*  10/2020  Kwok .................. H04W 24/02
2021/0029605 A1*  1/2021  Kadiri .............. H04W 36/0069
2021/0045173 A1*  2/2021  Takeda ............. H04W 72/0446

OTHER PUBLICATIONS

International Search Report and Written Opinion—PCT/US2021/053512—ISA/EPO—dated Mar. 25, 2022.
Intel Corporation: "Summary for NR-Positoning AI—7.2.10.1.2 UL only Based Positioning", 3GPP Draft, 3GPP TSG RAN WG1 Meeting #96, R1-1903395—Intel—NR Pos AI 7.2.10.1.2—UL Pos, 3rd Generation Partnership Project (3GPP), Mobile Competence Centre, 650, Route Des Lucioles, F-06921 Sophia-Antipolis Cedex, France, vol. RAN WG1, No. Athens, Greece, Feb. 25, 2019-Mar. 1, 2019, Feb. 26, 2019 (Feb. 26, 2019), XP051601070, 12 pages, Retrieved from the Internet: URL: http://www.3gpp.org/ftp/tsg%5Fran/WG1%5FRL1/TSGR1%5F96/Docs/R1%2D1903395%2Ezip. [retrieved on Feb. 26, 2019] section 2.2 Aspect #2.
Moderator (CATT): "FL Summary #5 for Potential Positioning Enhancements", 3GPP Draft, R1-2007343, 3GPP TSG RAN WG1 Meeting #102-e, 3rd Generation Partnership Project (3GPP), Mobile Competence Centre, 650, Route Des Lucioles, F-06921 Sophia-Antipolis Cedex, France, vol. RAN WG1, No. e-meeting, May 25, 2020-Jun. 5, 2020, Aug. 28, 2020 (Aug. 28, 2020), XP051922845, 113 Pages, Retrieved from the Internet: URL:https://ftp.3gpp.org/tsg_ran/WG1_RL1/TSGR1_102-e/Docs/R1-2007343.zip R1-2007343 FL Summary #5 for NR PosEnh_v021_FL.docx [retrieved on Aug. 28, 2020] title pp. 17-21 section 2.3 DL PRS processing with aggregated DL PRS resources.

\* cited by examiner

UPLINK-BASED POSITIONING

BACKGROUND

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service, a fourth-generation (4G) service (e.g., Long Term Evolution (LTE) or WiMax), a fifth-generation (5G) service, etc. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Orthogonal Frequency Division Multiple Access (OFDMA), Time Division Multiple Access (TDMA), the Global System for Mobile access (GSM) variation of TDMA, etc.

A fifth generation (5G) mobile standard calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard.

Furthermore, signaling efficiencies should be enhanced and latency should be substantially reduced compared to current standards.

Obtaining the locations of mobile devices that are accessing a wireless network may be useful for many applications including, for example, emergency calls, personal navigation, consumer asset tracking, locating a friend or family member, etc. Existing positioning methods include methods based on measuring radio signals transmitted from a variety of devices or entities including satellite vehicles (SVs) and terrestrial radio sources in a wireless network such as base stations and access points. It is expected that standardization for the 5G wireless networks will include support for various positioning methods, which may utilize reference signals transmitted by base stations in a manner similar to which LTE wireless networks currently utilize Positioning Reference Signals (PRS) and/or Cell-specific Reference Signals (CRS) for position determination.

SUMMARY

An example user equipment (UE) includes: a transmitter configured to transmit signals according to a first radio access technology (RAT) and a second RAT respectively; a memory; and a processor communicatively coupled to the transmitter and the memory and configured to: send a first signal via the transmitter in accordance with the first RAT, the first signal being a positioning reference signal, send a second signal via the transmitter in accordance with a second RAT; and at least one of: (a) send only the first signal, from among the first signal and the second signal, via the transmitter in response to the first signal and the second signal being scheduled for concurrent transmission and available power for transmission of the first signal for the concurrent transmission being insufficient for detection of the first signal at a first-RAT transmission/reception point (TRP); or (b) set a power sharing mode of the UE to a static power sharing mode in response to initiation of a positioning session; or (c) indicate that the UE is in a single-uplink operating mode with respect to the first RAT and the second RAT in response to the initiation of the positioning session; or (d) select, in response to the initiation of the positioning session, a cell of a second-RAT TRP for receiving the second signal, the cell of the second-RAT TRP having a maximum UE transmission power no greater than a threshold power.

Implementations of such a UE may include one or more of the following features. The processor is configured to perform (a), and to determine whether the available power for transmission of the first signal for the concurrent transmission is more than a pathloss between the first-RAT TRP and the UE in order to determine that the available power for transmission of the first signal for the concurrent transmission is insufficient for detection of the first signal at the first-RAT TRP. The processor is configured to set the power sharing mode of the UE to the static power sharing mode in response to initiation of the positioning session and in response to the available power for transmission of the first signal for the concurrent transmission being insufficient for detection of the first signal at the first-RAT TRP. The processor is configured to indicate that the UE is in the single-uplink operating mode with respect to the first RAT and the second RAT in response to the initiation of the positioning session and in response to the available power for transmission of the first signal for the concurrent transmission being insufficient while in the static power sharing mode for detection of the first signal at the first-RAT TRP.

Also or alternatively, implementations of such a UE may include one or more of the following features. The processor is configured to indicate that the UE is in the single-uplink operating mode with respect to the first RAT and the second RAT in response to the initiation of the positioning session and in response to the available power for transmission of the first signal for the concurrent transmission being insufficient for detection of the first signal at the first-RAT TRP. The processor is configured to select the cell of the second-RAT TRP that has the maximum UE transmission power no greater than the threshold power in response to the initiation of the positioning session and in response to the available power for transmission of the first signal for the concurrent transmission being insufficient for detection of the first signal at the first-RAT TRP. The processor is configured to select the cell of the second-RAT TRP that has the maximum UE transmission power no greater than the threshold power in response to the initiation of the positioning session and a priority level of the positioning session. The threshold power is a first threshold power, and the processor is configured to perform at least one of (b), (c), or (d), in response to the available power for transmission of the first signal for the concurrent transmission being below a second threshold power that is equal to a transmit power determined in accordance with a power control equation minus a third threshold power. The second threshold power is 50% of a maximum transmit power corresponding to a power class of the UE. The processor is configured to perform (b) and to perform (c), and the processor is configured to select which of (b) and (c) to perform based on a serving cell of the UE.

Another example UE includes: means for sending a first signal in accordance with a first radio access technology (RAT), the first signal being a positioning reference signal; means for sending a second signal in accordance with a second RAT; and at least one of: (a) means for sending only the first signal, from among the first signal and the second signal, in response to the first signal and the second signal being scheduled for concurrent transmission and available power for transmission of the first signal for the concurrent transmission being insufficient for detection of the first signal at a first-RAT transmission/reception point (TRP); or (b) means for setting a power sharing mode of the UE to a static power sharing mode in response to initiation of a positioning session; or (c) means for indicating that the UE is in a single-uplink operating mode with respect to the first RAT and the second RAT in response to the initiation of the positioning session; or (d) means for selecting, in response to the initiation of the positioning session, a cell of a second-RAT TRP for receiving the second signal, the cell of the second-RAT TRP having a maximum UE transmission power no greater than a threshold power.

Implementations of such a UE may include one or more of the following features. The UE includes the means for sending of (a), and means for determining whether the available power for transmission of the first signal for the concurrent transmission is more than a pathloss between the first-RAT TRP and the UE in order to determine that the available power for transmission of the first signal for the concurrent transmission is insufficient for detection of the first signal at the first-RAT TRP. The UE includes the means for setting the power sharing mode, and the means for setting the power sharing mode include means for setting the power sharing mode of the UE to the static power sharing mode in response to initiation of the positioning session and in response to the available power for transmission of the first signal for the concurrent transmission being insufficient for detection of the first signal at the first-RAT TRP. The UE includes the means for indicating, and the means for indicating include means for indicating that the UE is in the single-uplink operating mode with respect to the first RAT and the second RAT in response to the initiation of the positioning session and in response to the available power for transmission of the first signal for the concurrent transmission being insufficient while in the static power sharing mode for detection of the first signal at the first-RAT TRP.

Also or alternatively, implementations of such a UE may include one or more of the following features. The UE includes the means for indicating, and the means for indicating include means for indicating that the UE is in the single-uplink operating mode with respect to the first RAT and the second RAT in response to the initiation of the positioning session and in response to the available power for transmission of the first signal for the concurrent transmission being insufficient for detection of the first signal at the first-RAT TRP. The UE includes the means for selecting, and the means for selecting include means for selecting the cell of the second-RAT TRP that has the maximum UE transmission power no greater than the threshold power in response to the initiation of the positioning session and in response to the available power for transmission of the first signal for the concurrent transmission being insufficient for detection of the first signal at the first-RAT TRP. The UE includes the means for selecting, and the means for selecting include means for selecting the cell of the second-RAT TRP in response to the initiation of the positioning session and a priority level of the positioning session. The threshold power is a first threshold power, and at least one of: the UE includes the means for setting and the means for setting are for setting the power sharing mode to the static power sharing mode in response to the available power for transmission of the first signal for the concurrent transmission being below a second threshold power that is equal to a transmit power, determined in accordance with a power control equation, minus a third threshold power; or the UE includes the means for indicating and the means for indicating are for indicating that the UE is in the single-uplink operating mode in response to the available power for transmission of the first signal for the concurrent transmission being below the second threshold power, or the UE includes the means for selecting and the means for selecting are for selecting the second-RAT TRP in response to the available power for transmission of the first signal for the concurrent transmission being below the second threshold power. The second threshold power is 50% of a maximum transmit power corresponding to a power class of the UE. The UE includes the means for setting and the means for indicating, and the UE includes means for determining, based on a serving cell of the UE, whether to set the power sharing mode or to indicate that the UE is in the single-uplink operating mode.

An example method at a UE for controlling uplink signal transmission includes: sending a first signal in accordance with a first radio access technology (RAT), the first signal being a positioning reference signal; and at least one of: (a) inhibiting transmission of a second signal, in accordance with a second RAT, in response to the first signal and the second signal being scheduled for concurrent transmission and available power for transmission of the first signal for the concurrent transmission being insufficient for detection of the first signal at a first-RAT transmission/reception point (TRP); or (b) setting a power sharing mode of the UE to a static power sharing mode in response to initiation of a positioning session; or (c) indicating that the UE is in a single-uplink operating mode with respect to the first RAT and the second RAT in response to the initiation of the positioning session; or (d) selecting, in response to the initiation of the positioning session, a cell of a second-RAT TRP for receiving the second signal, the cell of the second-RAT TRP having a maximum UE transmission power no greater than a threshold power.

Implementations of such a method may include one or more of the following features. The method includes inhibiting the transmission of the second signal, and the method includes determining that the available power for transmission of the first signal for the concurrent transmission is less than a pathloss between the first-RAT TRP and the UE in order to determine that the available power for transmission of the first signal for the concurrent transmission is insufficient for detection of the first signal at the first-RAT TRP. The method includes setting the power sharing mode of the UE to the static power sharing mode in response to initiation of the positioning session and in response to the available power for transmission of the first signal for the concurrent transmission being insufficient for detection of the first signal at the first-RAT TRP. The method includes indicating that the UE is in the single-uplink operating mode with respect to the first RAT and the second RAT in response to the initiation of the positioning session and in response to the available power for transmission of the first signal for the concurrent transmission being insufficient while in the static power sharing mode for detection of the first signal at the first-RAT TRP.

Also or alternatively, implementations of such a method may include one or more of the following features. The method includes indicating that the UE is in the single-uplink operating mode with respect to the first RAT and the second RAT in response to the initiation of the positioning session and in response to the available power for transmission of the first signal for the concurrent transmission being insufficient for detection of the first signal at the first-RAT TRP. The method includes selecting the cell of the second-RAT TRP that has the maximum UE transmission power no greater than the threshold power in response to the initiation of the positioning session and in response to the available power for transmission of the first signal for the concurrent transmission being insufficient for detection of the first signal at the first-RAT TRP. The method includes selecting the cell of the second-RAT TRP in response to the initiation of the positioning session and a priority level of the positioning session. The threshold power is a first threshold power, and the method includes at least one of: setting the power sharing mode to the static power sharing mode in response to the available power for transmission of the first signal for the concurrent transmission being below a second threshold power that is equal to a transmit power, determined in accordance with a power control equation, minus a third threshold power; or indicating that the UE is in the single-uplink operating mode in response to the available power for transmission of the first signal for the concurrent transmission being below the second threshold power; or selecting the second-RAT TRP in response to the available power for transmission of the first signal for the concurrent transmission being below the second threshold power. The second threshold power is 50% of a maximum transmit power corresponding to a power class of the UE. The method includes determining, based on a serving cell of the UE, whether to set the power sharing mode to the static power sharing mode or to indicate that the UE is in the single-uplink operating mode.

An example non-transitory, processor-readable storage medium includes processor-readable instructions configured to cause a processor, for controlling uplink signal transmission from a user equipment (UE), to: send a first signal in accordance with a first radio access technology (RAT), the first signal being a positioning reference signal; and at least one of: (a) inhibit transmission of a second signal, in accordance with a second RAT, in response to the first signal and the second signal being scheduled for concurrent transmission and available power for transmission of the first signal for the concurrent transmission being insufficient for detection of the first signal at a first-RAT transmission/reception point (TRP); or (b) set a power sharing mode of the UE to a static power sharing mode in response to initiation of a positioning session; or (c) indicate that the UE is in a single-uplink operating mode with respect to the first RAT and the second RAT in response to the initiation of the positioning session; or (d) select, in response to the initiation of the positioning session, a cell of a second-RAT TRP for receiving the second signal, the cell of the second-RAT TRP having a maximum UE transmission power no greater than a threshold power.

Implementations of such a storage medium may include one or more of the following features. The instructions include instructions configured to cause the processor to inhibit transmission of the second signal, and the instructions include instructions configured to cause the processor to determine that the available power for transmission of the first signal for the concurrent transmission is less than a pathloss between the first-RAT TRP and the UE in order to determine that the available power for transmission of the first signal for the concurrent transmission is insufficient for detection of the first signal at the first-RAT TRP. The instructions include instructions configured to cause the processor to set the power sharing mode of the UE to the static power sharing mode in response to initiation of the positioning session and in response to the available power for transmission of the first signal for the concurrent transmission being insufficient for detection of the first signal at the first-RAT TRP. The instructions include instructions configured to cause the processor to indicate that the UE is in the single-uplink operating mode with respect to the first RAT and the second RAT in response to the initiation of the positioning session and in response to the available power for transmission of the first signal for the concurrent transmission being insufficient while in the static power sharing mode for detection of the first signal at the first-RAT TRP.

Also or alternatively, implementations of such a storage medium may include one or more of the following features. The instructions include instructions configured to cause the processor to indicate that the UE is in the single-uplink operating mode with respect to the first RAT and the second RAT in response to the initiation of the positioning session and in response to the available power for transmission of the first signal for the concurrent transmission being insufficient for detection of the first signal at the first-RAT TRP. The instructions include instructions configured to cause the processor to select the cell of the second-RAT TRP that has the maximum UE transmission power no greater than the threshold power in response to the initiation of the positioning session and in response to the available power for transmission of the first signal for the concurrent transmission being insufficient for detection of the first signal at the first-RAT TRP. The instructions include instructions configured to cause the processor to select the cell of the second-RAT TRP in response to the initiation of the positioning session and a priority level of the positioning session. The threshold power is a first threshold power, and the instructions include instructions configured to cause the processor to at least one of: set the power sharing mode to the static power sharing mode in response to the available power for transmission of the first signal for the concurrent transmission being below a second threshold power that is equal to a transmit power, determined in accordance with a power control equation, minus a third threshold power; or indicate that the UE is in the single-uplink operating mode in response to the available power for transmission of the first signal for the concurrent transmission being below the second threshold power; or select the second-RAT TRP in response to the available power for transmission of the first signal for the concurrent transmission being below the second threshold power. The second threshold power is 50% of a maximum transmit power corresponding to a power class of the UE. The instructions include instructions configured to cause the processor to determine, based on a serving cell of the UE, whether to set the power sharing mode to the static power sharing mode or to indicate that the UE is in the single-uplink operating mode.

An example network entity includes: a memory; and a processor communicatively coupled to the memory and configured to: determine whether an overlap in time of transmission of a first signal, in accordance with a first radio access technology (RAT) from a user equipment (UE), and transmission of a second signal, in accordance with a second RAT from the UE, is unacceptable, the first signal being a positioning reference signal; and at least one of: determine, in response to the overlap being unacceptable, a schedule for at least one of the first signal or the second signal to avoid the overlap; or determine, in response to the overlap being unacceptable, a cell of a second-RAT transmission/reception point (TRP), for receiving the second signal, that has a maximum UE transmission power no greater than a threshold power.

Implementations of such a network entity may include one or more of the following features. To determine whether the overlap is unacceptable, the processor is configured to determine whether transmission power that will be available at the UE to transmit the first signal during the overlap will be sufficient for detection of the first signal at a first-RAT TRP. To determine whether the overlap is unacceptable, the processor is configured to determine whether a scheduled transmission of the first signal is received by a first-RAT TRP. To determine that the overlap is unacceptable, the processor is configured to determine whether the UE is in a single-uplink operating mode with respect to the first RAT and the second RAT. The processor is configured to determine the cell of the second-RAT TRP, and the threshold power is 20 dBm.

Another example network entity includes: overlap determining means for determining whether an overlap in time of transmission of a first signal, in accordance with a first radio access technology (RAT) from a user equipment (UE), and transmission of a second signal, in accordance with a second RAT from the UE, is unacceptable, the first signal being a positioning reference signal; and at least one of: schedule means for determining, in response to the overlap being unacceptable, a schedule for at least one of the first signal or the second signal to avoid the overlap; or selecting means for selecting, in response to the overlap being unacceptable, a cell of a second-RAT transmission/reception point (TRP), for receiving the second signal, that has a maximum UE transmission power no greater than a threshold power.

Implementations of such a network entity may include one or more of the following features. The overlap determining means include means for determining whether transmission power that will be available at the UE to transmit the first signal during the overlap will be sufficient for detection of the first signal at a first-RAT TRP. The overlap determining means include means for determining whether a scheduled transmission of the first signal is received by a first-RAT TRP. The overlap determining means include means for determining whether the UE is in a single-uplink operating mode with respect to the first RAT and the second RAT. The network entity includes the selecting means, and the threshold power is 20 dBm.

An example method at a network entity for facilitating positioning includes: determining whether an overlap in time of transmission of a first signal, in accordance with a first radio access technology (RAT) from a user equipment (UE), and transmission of a second signal, in accordance with a second RAT from the UE, is unacceptable, the first signal being a positioning reference signal, and at least one of: determining, in response to the overlap being unacceptable, a schedule for at least one of the first signal or the second signal to avoid the overlap; or determining, in response to the overlap being unacceptable, a cell of a second-RAT transmission/reception point (TRP), for receiving the second signal, that has a maximum UE transmission power no greater than a threshold power.

Implementations of such a method may include one or more of the following features. Determining whether the overlap is unacceptable includes determining whether transmission power that will be available at the UE to transmit the first signal during the overlap will be sufficient for detection of the first signal at a first-RAT TRP. Determining whether the overlap is unacceptable includes determining whether a scheduled transmission of the first signal is received by a first-RAT TRP. Determining whether the overlap is unacceptable includes determining whether the UE is in a single-uplink operating mode with respect to the first RAT and the second RAT. The method includes determining the cell of the second-RAT TRP, and the threshold power is 20 dBm.

An example non-transitory, processor-readable storage medium includes processor-readable instructions configured to cause a processor, for facilitating positioning, to: determine whether an overlap in time of transmission of a first signal, in accordance with a first radio access technology (RAT) from a user equipment (UE), and transmission of a second signal, in accordance with a second RAT from the UE, is unacceptable, the first signal being a positioning reference signal; and at least one of: determine, in response to the overlap being unacceptable, a schedule for at least one of the first signal or the second signal to avoid the overlap; or determine, in response to the overlap being unacceptable, a cell of a second-RAT transmission/reception point (TRP), for receiving the second signal, that has a maximum UE transmission power no greater than a threshold power.

Implementations of such a storage medium may include one or more of the following features. The instructions configured to cause the processor to determine whether the overlap is unacceptable include instructions configured to cause the processor to determine whether transmission power that will be available at the UE to transmit the first signal during the overlap will be sufficient for detection of the first signal at a first-RAT TRP. The instructions configured to cause the processor to determine whether the overlap is unacceptable include instructions configured to cause the processor to determine whether a scheduled transmission of the first signal is received by a first-RAT TRP. The instructions configured to cause the processor to determine whether the overlap is unacceptable include instructions configured to cause the processor to determine whether the UE is in a single-uplink operating mode with respect to the first RAT and the second RAT. The storage medium includes instructions configured to cause the processor to determine the cell of the second-RAT TRP, and the threshold power is 20 dBm.

DETAILED DESCRIPTION

Figure 1:
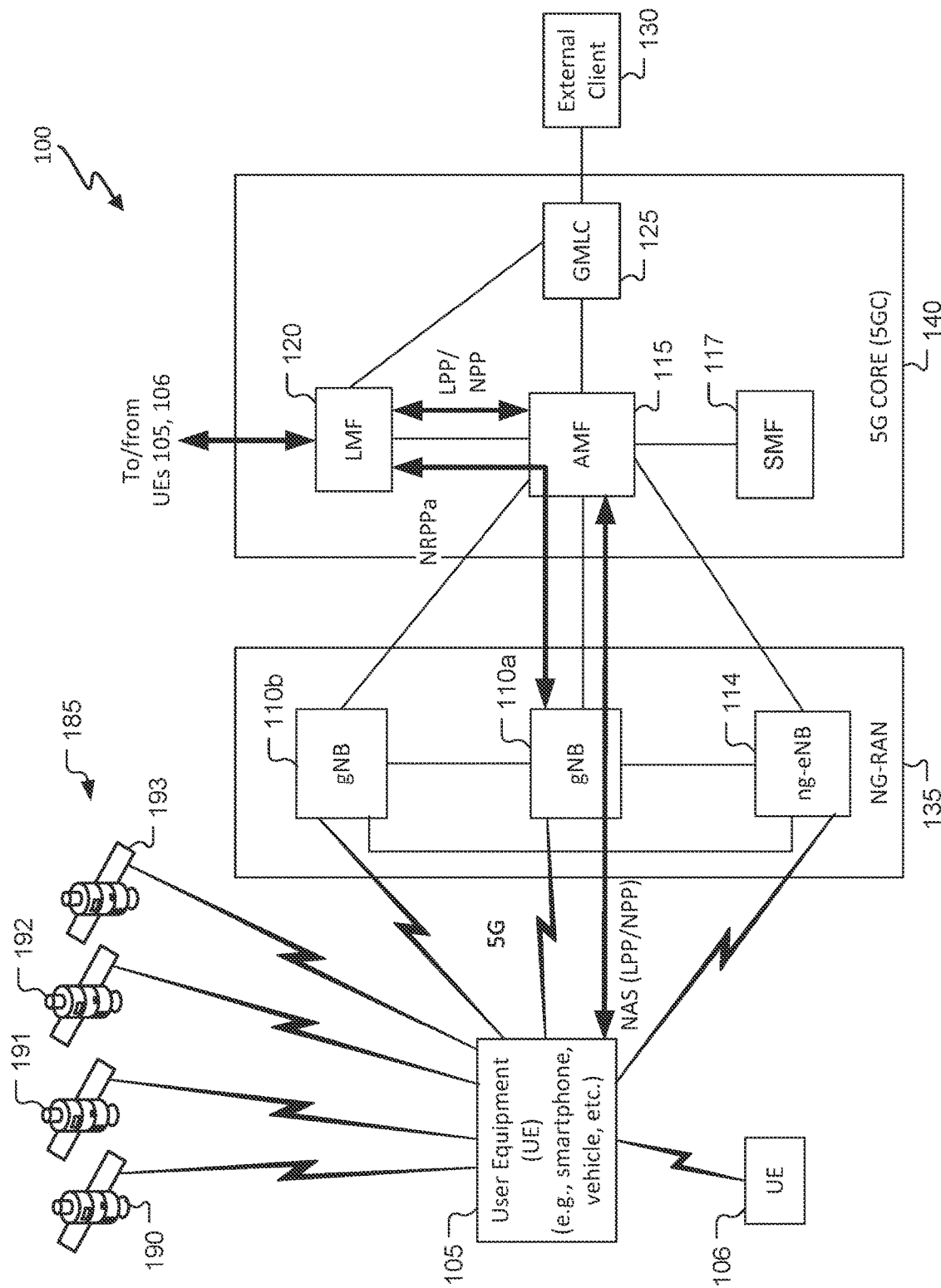
FIG. 1 is a simplified diagram of an example wireless communications system.

Techniques are discussed herein for helping to ensure that uplink positioning reference signals are transmitted from a user equipment (UE) with sufficient power to be detected. For example, one or more network entities can determine that concurrent transmission of a positioning reference signal (PRS) using one radio access technology (RAT) and another signal (e.g., a control signal or a data signal) using another RAT will result in the positioning reference signal not having enough power to be detected. The one or more network entities may reschedule the PRS or the other signal to avoid the concurrent transmission. As another example, the UE may not transmit the other signal, may implement a static power sharing mode, or may implement and indicate a single-uplink mode such that the UE will only transmit uplink signals using one RAT at a time (or at least one of the RATs for the PRS and the other signal). The UE may implement and indicate the single-uplink mode based on the static power sharing mode not resulting in sufficient transmit power for the PRS to be detected. As another example, a base station for reception of the other signal may be selected based on the base station having a maximum UE transmission power of a desired amount (e.g., no greater than a threshold such as 20 dBm). The base station may be selected in response to initiation of a positioning session, possibly in response to insufficient transmit power being available for the PRS during concurrent transmission of the PRS and the other signal, and/or possibly based on a priority level of the positioning session. Other examples, however, may be implemented.

Items and/or techniques described herein may provide one or more of the following capabilities, as well as other capabilities not mentioned. Positioning reference signal detection may be improved. Latency for position determination may be reduced by avoiding non-detection of positioning reference signals. Position estimation determination of a user equipment may be improved. Other capabilities may be provided and not every implementation according to the disclosure must provide any, let alone all, of the capabilities discussed.

The description may refer to sequences of actions to be performed, for example, by elements of a computing device. Various actions described herein can be performed by specific circuits (e.g., an application specific integrated circuit (ASIC)), by program instructions being executed by one or more processors, or by a combination of both. Sequences of actions described herein may be embodied within a non-transitory computer-readable medium having stored thereon a corresponding set of computer instructions that upon execution would cause an associated processor to perform the functionality described herein. Thus, the various aspects described herein may be embodied in a number of different forms, all of which are within the scope of the disclosure, including claimed subject matter.

As used herein, the terms "user equipment" (UE) and "base station" are not specific to or otherwise limited to any particular Radio Access Technology (RAT), unless otherwise noted. In general, such UEs may be any wireless communication device (e.g., a mobile phone, router, tablet computer, laptop computer, consumer asset tracking device, Internet of Things (IoT) device, etc.) used by a user to communicate over a wireless communications network. A UE may be mobile or may (e.g., at certain times) be stationary, and may communicate with a Radio Access Network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks. WiFi networks (e.g., based on IEEE 802.11, etc.) and so on.

A base station may operate according to one of several RATs in communication with UEs depending on the network in which it is deployed, and may be alternatively referred to as an Access Point (AP), a Network Node, a NodeB, an evolved NodeB (eNB), a general Node B (gNodeB, gNB), etc. In addition, in some systems a base station may provide purely edge node signaling functions while in other systems it may provide additional control and/or network management functions.

UEs may be embodied by any of a number of types of devices including but not limited to printed circuit (PC) cards, compact flash devices, external or internal modems, wireless or wireline phones, smartphones, tablets, consumer asset tracking devices, asset tags, and so on. A communication link through which UEs can send signals to a RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffrc channel, etc.). As used herein the term traffic channel (TCH) can refer to either an uplink/reverse or downlink/forward traffic channel.

As used herein, the term "cell" or "sector" may correspond to one of a plurality of cells of a base station, or to the base station itself, depending on the context. The term "cell" may refer to a logical communication entity used for communication with a base station (for example, over a carrier), and may be associated with an identifier for distinguishing neighboring cells (for example, a physical cell identifier (PCID), a virtual cell identifier (VCID)) operating via the same or a different carrier. In some examples, a carrier may support multiple cells, and different cells may be configured according to different protocol types (for example, machine-type communication (MTC), narrowband Internet-of-Things (NB-IoT), enhanced mobile broadband (eMBB), or others) that may provide access for different types of devices. The term "sector" may refer to a portion of a geographic coverage area over which the logical entity operates.

Referring to FIG. 1, an example of a communication system 100 includes a UE 105, a UE 106, a Radio Access Network (RAN) 135, here a Fifth Generation (5G) Next Generation (NG) RAN (NG-RAN), and a 5G Core Network (5GC) 140. The UE 105 and/or the UE 106 may be, e.g., an IoT device, a location tracker device, a cellular telephone, a vehicle, or other device. A 5G network may also be referred to as a New Radio (NR) network; NG-RAN 135 may be referred to as a 5G RAN or as an NR RAN: and 5GC 140 may be referred to as an NG Core network (NGC). Standardization of an NG-RAN and 5GC is ongoing in the 3rd Generation Partnership Project (3GPP). Accordingly, the NG-RAN 135 and the 5GC 140 may conform to current or future standards for 5G support from 3GPP. The RAN 135 may be another type of RAN, e.g., a 3G RAN, a 4G Long Term Evolution (LTE) RAN, etc. The UE 106 may be configured and coupled similarly to the UE 105 to send and/or receive signals to/from similar other entities in the system 100, but such signaling is not indicated in FIG. 1 for the sake of simplicity of the figure. Similarly, the discussion focuses on the UE 105 for the sake of simplicity. The communication system 100 may utilize information from a constellation 185 of satellite vehicles (SVs) 190, 191, 192, 193 for a Satellite Positioning System (SPS) (e.g., a Global Navigation Satellite System (GNSS)) like the Global Positioning System (GPS), the Global Navigation Satellite System (GLONASS), Galileo, or Beidou or some other local or regional SPS such as the Indian Regional Navigational Satellite System (IRNSS), the European Geostationary Navigation Overlay Service (EGNOS), or the Wide Area Augmentation System (WAAS). Additional components of the communication system 100 are described below. The communication system 100 may include additional or alternative components.

As shown in FIG. 1, the NG-RAN 135 includes NR nodeBs (gNBs) 110*a*, 110*b*, and a next generation eNodeB (ng-eNB) 114, and the 5GC 140 includes an Access and Mobility Management Function (AMF) 115, a Session Management Function (SMF) 117, a Location Management Function (LMF) 120, and a Gateway Mobile Location Center (GMLC) 125. The gNBs 110*a*, 110*b* and the ng-eNB 114 are communicatively coupled to each other, are each configured to bi-directionally wirelessly communicate with the UE 105, and are each communicatively coupled to, and configured to bi-directionally communicate with, the AMF 115. The gNBs 110*a*, 110*b*, and the ng-eNB 114 may be referred to as base stations (BSs). The AMF 115, the SMF 117, the LMF 120, and the GMLC 125 are communicatively coupled to each other, and the GMLC is communicatively coupled to an external client 130. The SMF 117 may serve as an initial contact point of a Service Control Function (SCF) (not shown) to create, control, and delete media sessions. The BSs 10*a*, 110*b*, 114 may be a macro cell (e.g., a high-power cellular base station), or a small cell (e.g., a low-power cellular base station), or an access point (e.g., a short-range base station configured to communicate with short-range technology such as WiFi, WiFi-Direct (WiFi-D), Bluetooth®, Bluetooth®-low energy (BLE), Zigbee, etc. One or more of the BSs 10*a*, 110*b*, 114 may be configured to communicate with the UE 105 via multiple carriers. Each of the BSs 110*a*, 110*b*, 114 may provide communication coverage for a respective geographic region, e.g. a cell. Each cell may be partitioned into multiple sectors as a function of the base station antennas.

FIG. 1 provides a generalized illustration of various components, any or all of which may be utilized as appropriate, and each of which may be duplicated or omitted as necessary. Specifically, although only one UE 105 is illustrated, many UEs (e.g., hundreds, thousands, millions, etc.) may be utilized in the communication system 100. Similarly, the communication system 100 may include a larger (or smaller) number of SVs (i.e., more or fewer than the four SVs 190-193 shown), gNBs 110*a*, 110*b*, ng-eNBs 114, AMFs 115, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1 illustrates a 5G-based network, similar network implementations and configurations may be used for other communication technologies, such as 3G, Long Term Evolution (LTE), etc. Implementations described herein (be they for 5G technology and/or for one or more other communication technologies and/or protocols) may be used to transmit (or broadcast) directional synchronization signals, receive and measure directional signals at UEs (e.g., the UE 105) and/or provide location assistance to the UE 105 (via the GMLC 125 or other location server) and/or compute a location for the UE 105 at a location-capable device such as the UE 105, the gNB 110*a*, 110*b*, or the LMF 120 based on measurement quantities received at the UE 105 for such directionally-transmitted signals. The gateway mobile location center (GMLC) 125, the location management function (LMF) 120, the access and mobility management function (AMF) 115, the SMF 117, the ng-eNB (eNodeB) 114 and the gNBs (gNodeBs) 110*a*, 110*b* are examples and may, in various embodiments, be replaced by or include various other location server functionality and/or base station functionality respectively.

The system 100 is capable of wireless communication in that components of the system 100 can communicate with one another (at least some times using wireless connections) directly or indirectly, e.g., via the BSs 110*a*, 110*b*, 114 and/or the network 140 (and/or one or more other devices not shown, such as one or more other base transceiver stations). For indirect communications, the communications may be altered during transmission from one entity to another, e.g., to alter header information of data packets, to change format, etc. The UE 105 may include multiple UEs and may be a mobile wireless communication device, but may communicate wirelessly and via wired connections. The UE 105 may be any of a variety of devices, e.g., a smartphone, a tablet computer, a vehicle-based device, etc., but these are examples only as the UE 105 is not required to be any of these configurations, and other configurations of UEs may be used. Other UEs may include wearable devices (e.g., smart watches, smart jewelry, smart glasses or headsets, etc.). Still other UEs may be used, whether currently existing or developed in the future. Further, other wireless devices (whether mobile or not) may be implemented within the system 100 and may communicate with each other and/or with the UE 105, the BSs 110*a*, 110*b*, 114, the core network 140, and/or the external client 130. For example, such other devices may include internet of thing (IoT) devices, medical devices, home entertainment and/or automation devices, etc. The core network 140 may communicate with the external client 130 (e.g., a computer system), e.g., to allow the external client 130 to request and/or receive location information regarding the UE 105 (e.g., via the GMLC 125).

The UE 105 or other devices may be configured to communicate in various networks and/or for various purposes and/or using various technologies (e.g., 5G, Wi-Fi communication, multiple frequencies of Wi-Fi communication, satellite positioning, one or more types of communications (e.g., GSM (Global System for Mobiles), CDMA (Code Division Multiple Access), LTE (Long-Term Evolution), V2X (e.g., V2P (Vehicle-to-Pedestrian), V2I (Vehicle-to-Infrastructure), V2V (Vehicle-to-Vehicle), etc.), IEEE 802.11p, etc.). V2X communications may be cellular (Cellular-V2X (C-V2X)) and/or WiFi (e.g., DSRC (Dedicated Short-Range Connection)). The system 100 may support operation on multiple carriers (waveform signals of different frequencies). Multi-carrier transmitters can transmit modulated signals simultaneously on the multiple carriers. Each modulated signal may be a Code Division Multiple Access (CDMA) signal, a Time Division Multiple Access (TDMA) signal, an Orthogonal Frequency Division Multiple Access (OFDMA) signal, a Single-Carrier Frequency Division Multiple Access (SC-FDMA) signal, etc. Each modulated signal may be sent on a different carrier and may carry pilot, overhead information, data, etc. The UEs 105, 106 may communicate with each other through UE-to-UE sidelink (SL) communications by transmitting over one or more sidelink channels such as a physical sidelink synchronization channel (PSSCH), a physical sidelink broadcast channel (PSBCH), or a physical sidelink control channel (PSCCH).

The UE 105 may comprise and/or may be referred to as a device, a mobile device, a wireless device, a mobile terminal, a terminal, a mobile station (MS), a Secure User Plane Location (SUPL) Enabled Terminal (SET), or by some other name. Moreover, the UE 105 may correspond to a cellphone, smartphone, laptop, tablet, PDA, consumer asset tracking device, navigation device, Internet of Things (IoT) device, asset tracker, health monitors, security systems, smart city sensors, smart meters, wearable trackers, or some other portable or moveable device. Typically, though not necessarily, the UE 105 may support wireless communication using one or more Radio Access Technologies (RATs) such as Global System for Mobile communication (GSM), Code Division Multiple Access (CDMA), Wideband CDMA (WCDMA), LTE, High Rate Packet Data (HRPD), IEEE 802.11 WiFi (also referred to as Wi-Fi), Bluetooth® (BT), Worldwide Interoperability for Microwave Access (WiMAX), 5G new radio (NR) (e.g., using the NG-RAN 135 and the 5GC 140), etc. The UE 105 may support wireless communication using a Wireless Local Area Network (WLAN) which may connect to other networks (e.g., the Internet) using a Digital Subscriber Line (DSL) or packet cable, for example. The use of one or more of these RATs may allow the UE 105 to communicate with the external client 130 (e.g., via elements of the 5GC 140 not shown in FIG. 1, or possibly via the GMLC 125) and/or allow the external client 130 to receive location information regarding the UE 105 (e.g., via the GMLC 125).

The UE 105 may include a single entity or may include multiple entities such as in a personal area network where a user may employ audio, video and/or data I/O (input/output) devices and/or body sensors and a separate wireline or wireless modem. An estimate of a location of the UE 105 may be referred to as a location, location estimate, location fix, fix, position, position estimate, or position fix, and may be geographic, thus providing location coordinates for the UE 105 (e.g., latitude and longitude) which may or may not include an altitude component (e.g., height above sea level, height above or depth below ground level, floor level, or basement level). Alternatively, a location of the UE 105 may be expressed as a civic location (e.g., as a postal address or the designation of some point or small area in a building such as a particular room or floor). A location of the UE 105 may be expressed as an area or volume (defined either geographically or in civic form) within which the UE 105 is expected to be located with some probability or confidence level (e.g., 67%, 95%, etc.). A location of the UE 105 may be expressed as a relative location comprising, for example, a distance and direction from a known location. The relative location may be expressed as relative coordinates (e.g., X, Y (and Z) coordinates) defined relative to some origin at a known location which may be defined, e.g., geographically, in civic terms, or by reference to a point, area, or volume, e.g., indicated on a map, floor plan, or building plan. In the description contained herein, the use of the term location may comprise any of these variants unless indicated otherwise. When computing the location of a UE, it is common to solve for local x, y, and possibly z coordinates and then, if desired, convert the local coordinates into absolute coordinates (e.g., for latitude, longitude, and altitude above or below mean sea level).

The UE 105 may be configured to communicate with other entities using one or more of a variety of technologies. The UE 105 may be configured to connect indirectly to one or more communication networks via one or more device-to-device (D2D) peer-to-peer (P2P) links. The D2D P2P links may be supported with any appropriate D2D radio access technology (RAT), such as LTE Direct (LTE-D), WiFi Direct (WiFi-D), Bluetooth®, and so on. One or more of a group of UEs utilizing D2D communications may be within a geographic coverage area of a Transmission/Reception Point (TRP) such as one or more of the gNBs 110a, 110b, and/or the ng-eNB 114. Other UEs in such a group may be outside such geographic coverage areas, or may be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP. One or more of a group of UEs utilizing D2D communications may be within a geographic coverage area of a TRP. Other UEs in such a group may be outside such geographic coverage areas, or be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases. D2D communications may be carried out between UEs without the involvement of a TRP.

Base stations (BSs) in the NG-RAN 135 shown in FIG. 1 include NR Node Bs, referred to as the gNBs 110a and 110b. Pairs of the gNBs 110a, 110b in the NG-RAN 135 may be connected to one another via one or more other gNBs. Access to the 5G network is provided to the UE 105 via wireless communication between the UE 105 and one or more of the gNBs 110a, 110b, which may provide wireless communications access to the 5GC 140 on behalf of the UE 105 using 5G. In FIG. 1, the serving gNB for the UE 105 is assumed to be the gNB 110a, although another gNB (e.g. the gNB 110b) may act as a serving gNB if the UE 105 moves to another location or may act as a secondary gNB to provide additional throughput and bandwidth to the UE 105.

Base stations (BSs) in the NG-RAN 135 shown in FIG. 1 may include the ng-eNB 114, also referred to as a next generation evolved Node B. The ng-eNB 114 may be connected to one or more of the gNBs 110a, 110b in the NG-RAN 135, possibly via one or more other gNBs and/or one or more other ng-eNBs. The ng-eNB 114 may provide LTE wireless access and/or evolved LTE (eLTE) wireless access to the UE 105. One or more of the gNBs 110a, 110b and/or the ng-eNB 114 may be configured to function as positioning-only beacons which may transmit signals to assist with determining the position of the UE 105 but may not receive signals from the UE 105 or from other UEs.

The BSs 110a, 110b, 114 may each comprise one or more TRPs. For example, each sector within a cell of a BS may comprise a TRP, although multiple TRPs may share one or more components (e.g., share a processor but have separate antennas). The system 100 may include only macro TRPs or the system 100 may have TRPs of different types, e.g., macro, pico, and/or femto TRPs, etc. A macro TRP may cover a relatively large geographic area (e.g., several kilometers in radius) and may allow unrestricted access by terminals with service subscription. A pico TRP may cover a relatively small geographic area (e.g., a pico cell) and may allow unrestricted access by terminals with service subscription. A femto or home TRP may cover a relatively small geographic area (e.g., a femto cell) and may allow restricted access by terminals having association with the femto cell (e.g., terminals for users in a home).

As noted, while FIG. 1 depicts nodes configured to communicate according to 5G communication protocols, nodes configured to communicate according to other communication protocols, such as, for example, an LTE protocol or IEEE 802.11x protocol, may be used. For example, in an Evolved Packet System (EPS) providing LTE wireless access to the UE 105, a RAN may comprise an Evolved Universal Mobile Telecommunications System (UMTS) Terrestrial Radio Access Network (E-UTRAN) which may comprise base stations comprising evolved Node Bs (eNBs). A core network for EPS may comprise an Evolved Packet Core (EPC). An EPS may comprise an E-UTRAN plus EPC, where the E-UTRAN corresponds to the NG-RAN 135 and the EPC corresponds to the 5GC 140 in FIG. 1.

The gNBs 110*a*, 110*b* and the ng-eNB 114 may communicate with the AMF 115, which, for positioning functionality, communicates with the LMF 120. The AMF 115 may support mobility of the UE 105, including cell change and handover and may participate in supporting a signaling connection to the UE 105 and possibly data and voice bearers for the UE 105. The LMF 120 may communicate directly with the UE 105, e.g., through wireless communications, or directly with the BSs 110*a*, 110*b*, 114. The LMF 120 may support positioning of the UE 105 when the UE 105 accesses the NG-RAN 135 and may support position procedures/methods such as Assisted GNSS (A-GNSS), Observed Time Difference of Arnval (OTDOA) (e.g., Downlink (DL) OTDOA or Uplink (UL) OTDOA), Round Trip Time (RTT), Multi-Cell RTT, Real Time Kinematics (RTK), Precise Point Positioning (PPP), Differential GNSS (DGNSS), Enhanced Cell ID (E-CID), angle of arrival (AOA), angle of departure (AOD), and/or other position methods. The LMF 120 may process location services requests for the UE 105, e.g., received from the AMF 115 or from the GMLC 125. The LMF 120 may be connected to the AMF 115 and/or to the GMLC 125. The LMF 120 may be referred to by other names such as a Location Manager (LM), Location Function (LF), commercial LMF (CLMF), or value added LMF (VLMF). A node/system that implements the LMF 120 may additionally or alternatively implement other types of location-support modules, such as an Enhanced Serving Mobile Location Center (E-SMLC) or a Secure User Plane Location (SUPL) Location Platform (SLP). At least part of the positioning functionality (including derivation of the location of the UE 105) may be performed at the UE 105 (e.g., using signal measurements obtained by the UE 105 for signals transmitted by wireless nodes such as the gNBs 110*a*, 110*b* and/or the ng-eNB 114, and/or assistance data provided to the UE 105, e.g. by the LMF 120). The AMF 115 may, serve as a control node that processes signaling between the UE 105 and the core network 140, and may provide QoS (Quality of Service) flow and session management. The AMF 115 may support mobility of the UE 105 including cell change and handover and may participate in supporting signaling connection to the UE 105.

The GMLC 125 may support a location request for the UE 105 received from the external client 130 and may forward such a location request to the AMF 115 for forwarding by the AMF 115 to the LMF 120 or may forward the location request directly to the LMF 120. A location response from the LMF 120 (e.g., containing a location estimate for the UE 105) may be returned to the GMLC 125 either directly or via the AMF 115 and the GMLC 125 may then return the location response (e.g., containing the location estimate) to the external client 130. The GMLC 125 is shown connected to both the AMF 115 and LMF 120, though only one of these connections may be supported by the 5GC 140 in some implementations.

As further illustrated in FIG. 1, the LMF 120 may communicate with the gNBs 110*a*, 110*b* and/or the ng-eNB 114 using a New Radio Position Protocol A (which may be referred to as NPPa or NRPPa), which may be defined in 3GPP Technical Specification (TS) 38.455. NRPPa may be the same as, similar to, or an extension of the LTE Positioning Protocol A (LPPa) defined in 3GPP TS 36.455, with NRPPa messages being transferred between the gNB 110*a* (or the gNB 110*b*) and the LMF 120, and/or between the ng-eNB 114 and the LMF 120, via the AMF 115. As further illustrated in FIG. 1, the LMF 120 and the UE 105 may communicate using an LTE Positioning Protocol (LPP), which may be defined in 3GPP TS 36.355. The LMF 120 and the UE 105 may also or instead communicate using a New Radio Positioning Protocol (which may be referred to as NPP or NRPP), which may be the same as, similar to, or an extension of LPP. Here, LPP and/or NPP messages may be transferred between the UE 105 and the LMF 120 via the AMF 115 and the serving gNB 110*a*, 110*b* or the serving ng-eNB 114 for the UE 105. For example, LPP and/or NPP messages may be transferred between the LMF 120 and the AMF 115 using a 5G Location Services Application Protocol (LCS AP) and may be transferred between the AMF 115 and the UE 105 using a 5G Non-Access Stratum (NAS) protocol. The LPP and/or NPP protocol may be used to support positioning of the UE 105 using UE-assisted and/or UE-based position methods such as A-GNSS, RTK, OTDOA and/or E-CID. The NRPPa protocol may be used to support positioning of the UE 105 using network-based position methods such as E-CID (e.g., when used with measurements obtained by the gNB 110*a*, 110*b* or the ng-eNB 114) and/or may be used by the LMF 120 to obtain location related information from the gNBs 110*a*, 110*b* and/or the ng-eNB 114, such as parameters defining directional SS transmissions from the gNBs 110*a*, 110*b*, and/or the ng-eNB 114. The LMF 120 may be co-located or integrated with a gNB or a TRP, or may be disposed remote from the gNB and/or the TRP and configured to communicate directly or indirectly with the gNB and/or the TRP.

With a UE-assisted position method, the UE 105 may obtain location measurements and send the measurements to a location server (e.g., the LMF 120) for computation of a location estimate for the UE 105. For example, the location measurements may include one or more of a Received Signal Strength Indication (RSSI), Round Trip signal propagation Time (RTT), Reference Signal Time Difference (RSTD), Reference Signal Received Power (RSRP) and/or Reference Signal Received Quality (RSRQ) for the gNBs 110*a*, 110*b*, the ng-eNB 114, and/or a WLAN AP. The location measurements may also or instead include measurements of GNSS pseudorange, code phase, and/or carrier phase for the SVs 190-193.

With a UE-based position method, the UE 105 may obtain location measurements (e.g., which may be the same as or similar to location measurements for a UE-assisted position method) and may compute a location of the UE 105 (e.g., with the help of assistance data received from a location server such as the LMF 120 or broadcast by the gNBs 110a, 110b, the ng-eNB 114, or other base stations or APs).

With a network-based position method, one or more base stations (e.g., the gNBs 110a, 110b, and/or the ng-eNB 114) or APs may obtain location measurements (e.g., measurements of RSSI, RTT, RSRP, RSRQ or Time Of Arrival (ToA) for signals transmitted by the UE 105) and/or may receive measurements obtained by the UE 105. The one or more base stations or APs may send the measurements to a location server (e.g., the LMF 120) for computation of a location estimate for the UE 105.

Information provided by the gNBs 110a, 110b, and/or the ng-eNB 114 to the LMF 120 using NRPPa may include timing and configuration information for directional SS transmissions and location coordinates. The LMF 120 may provide some or all of this information to the UE 105 as assistance data in an LPP and/or NPP message via the NG-RAN 135 and the 5GC 140.

An LPP or NPP message sent from the LMF 120 to the UE 105 may instruct the UE 105 to do any of a variety of things depending on desired functionality. For example, the LPP or NPP message could contain an instruction for the UE 105 to obtain measurements for GNSS (or A-GNSS), WLAN, E-CID, and/or OTDOA (or some other position method). In the case of E-CID, the LPP or NPP message may instruct the UE 105 to obtain one or more measurement quantities (e.g., beam ID, beam width, mean angle, RSRP, RSRQ measurements) of directional signals transmitted within particular cells supported by one or more of the gNBs 110a, 110b, and/or the ng-eNB 114 (or supported by some other type of base station such as an eNB or WiFi AP). The UE 105 may send the measurement quantities back to the LMF 120 in an LPP or NPP message (e.g., inside a 5G NAS message) via the serving gNB 110a (or the serving ng-eNB 114) and the AMF 115.

As noted, while the communication system 100 is described in relation to 50 technology, the communication system 100 may be implemented to support other communication technologies, such as GSM, WCDMA, LTE, etc., that are used for supporting and interacting with mobile devices such as the UE 105 (e.g., to implement voice, data, positioning, and other functionalities). In some such embodiments, the 5GC 140 may be configured to control different air interfaces. For example, the 5GC 140 may be connected to a WLAN using a Non-3GPP InterWorking Function (N3IWF, not shown FIG. 1) in the 5GC 150. For example, the WLAN may support IEEE 802.11 WiFi access for the UE 105 and may comprise one or more WiFi APs. Here, the N3IWF may connect to the WLAN and to other elements in the 5GC 140 such as the AMF 115. In some embodiments, both the NG-RAN 135 and the 5GC 140 may be replaced by one or more other RANs and one or more other core networks. For example, in an EPS, the NG-RAN 135 may be replaced by an E-UTRAN containing eNBs and the 5GC 140 may be replaced by an EPC containing a Mobility Management Entity (MME) in place of the AMF 115, an E-SMLC in place of the LMF 120, and a GMLC that may be similar to the GMLC 125. In such an EPS, the E-SMLC may use LPPa in place of NRPPa to send and receive location information to and from the eNBs in the E-UTRAN and may use LPP to support positioning of the UE 105. In these other embodiments, positioning of the UE 105 using directional PRSs may be supported in an analogous manner to that described herein for a 5G network with the difference that functions and procedures described herein for the gNBs 110a, 110b, the ng-eNB 114, the AMF 115, and the LMF 120 may, in some cases, apply instead to other network elements such eNBs. WiFi APs, an MME, and an E-SMLC.

As noted, in some embodiments, positioning functionality may be implemented, at least in part, using the directional SS beams, sent by base stations (such as the gNBs 110a, 110b, and/or the ng-eNB 114) that are within range of the UE whose position is to be determined (e.g., the UE 105 of FIG. 1). The UE may, in some instances, use the directional SS beams from a plurality of base stations (such as the gNBs 110a, 110b, the ng-eNB 114, etc.) to compute the UE's position.

Figure 2:
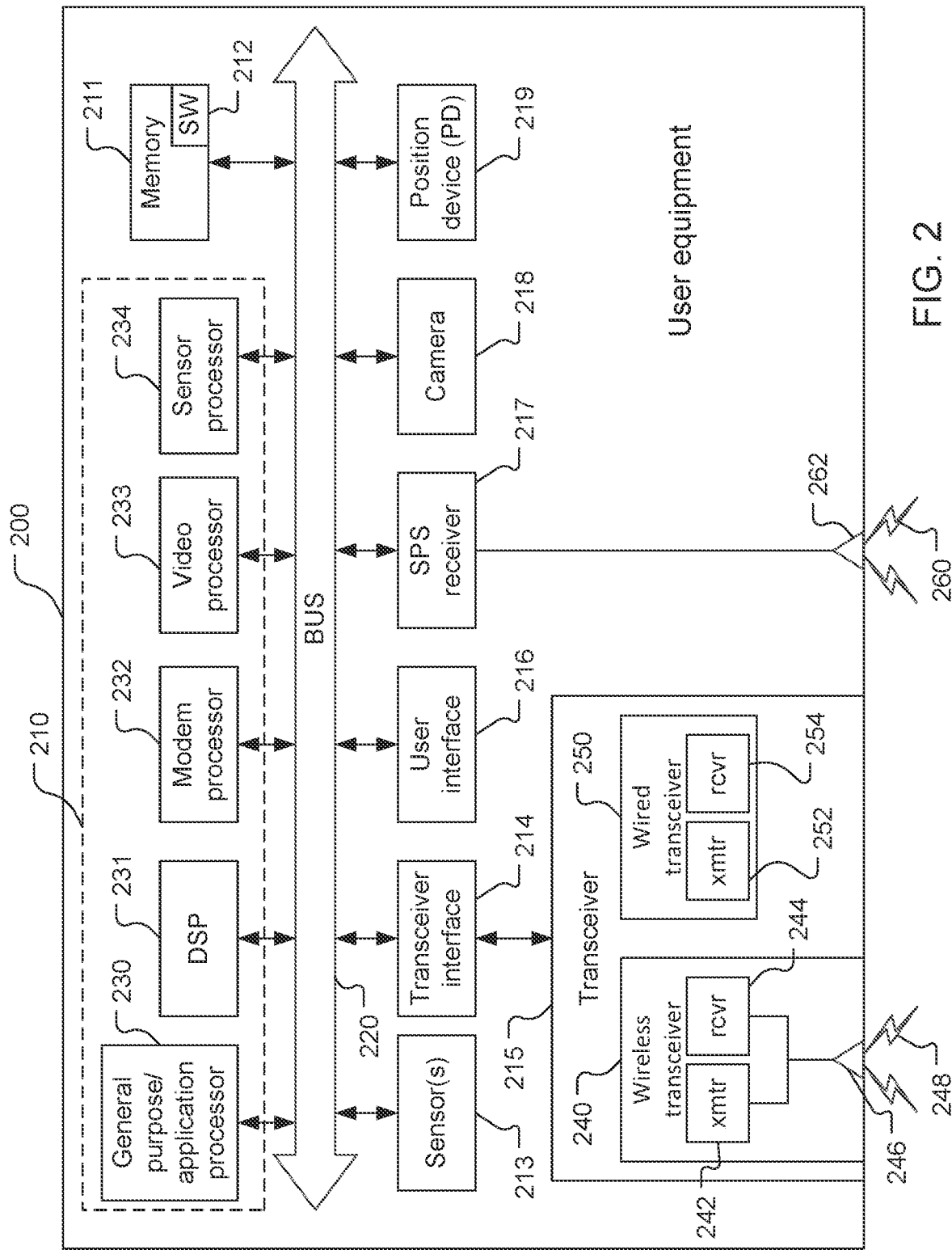
FIG. 2 is a block diagram of components of an example user equipment shown in FIG. 1.

Referring also to FIG. 2, a UE 200 is an example of one of the UEs 105, 106 and comprises a computing platform including a processor 210, memory 211 including software (SW) 212, one or more sensors 213, a transceiver interface 214 for a transceiver 215, a user interface 216, a Satellite Positioning System (SPS) receiver 217, a camera 218, and a position device (PD) 219. The processor 210, the memory 211, the sensor(s) 213, the transceiver interface 214, the user interface 216, the SPS receiver 217, the camera 218, and the position device 219 may be communicatively coupled to each other by a bus 220 (which may be configured, e.g., for optical and/or electrical communication). One or more of the shown apparatus (e.g., the camera 218, the position device 219, and/or one or more of the sensor(s) 213, etc.) may be omitted from the UE 200. The processor 210 may include one or more intelligent hardware devices, e.g., a central processing unit (CPU), a microcontroller, an application specific integrated circuit (ASIC), etc. The processor 210 may comprise multiple processors including a general-purpose/application processor 230, a Digital Signal Processor (DSP) 231, a modem processor 232, a video processor 233, and/or a sensor processor 234. One or more of the processors 230-234 may comprise multiple devices (e.g., multiple processors). For example, the sensor processor 234 may comprise, e.g., processors for radar, ultrasound, and/or lidar, etc. The modem processor 232 may support dual SIM/dual connectivity (or even more SIMs). For example, a SIM (Subscriber Identity Module or Subscriber Identification Module) may be used by an Original Equipment Manufacturer (OEM), and another SIM may be used by an end user of the UE 200 for connectivity. The memory 211 is a non-transitory storage medium that may include random access memory (RAM), flash memory, disc memory, and/or read-only memory (ROM), etc. The memory 211 stores the software 212 which may be processor-readable, processor-executable software code containing instructions that are configured to, when executed, cause the processor 210 to perform various functions described herein. Alternatively, the software 212 may not be directly executable by the processor 210 but may be configured to cause the processor 210, e.g., when compiled and executed, to perform the functions. The description may refer only to the processor 210 performing a function, but this includes other implementations such as where the processor 210 executes software and/or firmware. The description may refer to the processor 210 performing a function as shorthand for one or more of the processors 230-234 performing the function. The description may refer to the UE 200 performing a function as shorthand for one or more appropriate components of the UE 200 performing the function. The processor 210 may include a memory with stored instructions in addition to and/or instead of the memory 211. Functionality of the processor 210 is discussed more fully below.

The configuration of the UE 200 shown in FIG. 2 is an example and not limiting of the invention, including the claims, and other configurations may be used. For example, an example configuration of the UE includes one or more of the processors 230-234 of the processor 210, the memory 211, and a wireless transceiver 240. Other example configurations include one or more of the processors 230-234 of the processor 210, the memory 211, the wireless transceiver 240, and one or more of the sensor(s) 213, the user interface 216, the SPS receiver 217, the camera 218, the PD 219, and/or a wired transceiver 250.

The UE 200 may comprise the modem processor 232 that may be capable of performing baseband processing of signals received and down-converted by the transceiver 215 and/or the SPS receiver 217. The modem processor 232 may perform baseband processing of signals to be upconverted for transmission by the transceiver 215. Also or alternatively, baseband processing may be performed by the processor 230 and/or the DSP 231. Other configurations, however, may be used to perform baseband processing.

The UE 200 may include the sensor(s) 213 that may include, for example, one or more of various types of sensors such as one or more inertial sensors, one or more magnetometers, one or more environment sensors, one or more optical sensors, one or more weight sensors, and/or one or more radio frequency (RF) sensors, etc. An inertial measurement unit (IMU) may comprise, for example, one or more accelerometers (e.g., collectively responding to acceleration of the UE 200 in three dimensions) and/or one or more gyroscopes (e.g., three-dimensional gyroscope(s)). The sensor(s) 213 may include one or more magnetometers (e.g., three-dimensional magnetometer(s)) to determine orientation (e.g., relative to magnetic north and/or true north) that may be used for any of a variety of purposes, e.g., to support one or more compass applications. The environment sensor(s) may comprise, for example, one or more temperature sensors, one or more barometric pressure sensors, one or more ambient light sensors, one or more camera imagers, and/or one or more microphones, etc. The sensor(s) 213 may generate analog and/or digital signals indications of which may be stored in the memory 211 and processed by the DSP 231 and/or the processor 230 in support of one or more applications such as, for example, applications directed to positioning and/or navigation operations.

The sensor(s) 213 may be used in relative location measurements, relative location determination, motion determination, etc. Information detected by the sensor(s) 213 may be used for motion detection, relative displacement, dead reckoning, sensor-based location determination, and/or sensor-assisted location determination. The sensor(s) 213 may be useful to determine whether the UE 200 is fixed (stationary) or mobile and/or whether to report certain useful information to the LMF 120 regarding the mobility of the UE 200. For example, based on the information obtained/measured by the sensor(s), the UE 200 may notify/report to the LMF 120 that the UE 200 has detected movements or that the UE 200 has moved, and report the relative displacement/distance (e.g., via dead reckoning, or sensor-based location determination, or sensor-assisted location determination enabled by the sensor(s) 213). In another example, for relative positioning information, the sensors/IMU can be used to determine the angle and/or orientation of the other device with respect to the UE 200, etc.

The IMU may be configured to provide measurements about a direction of motion and/or a speed of motion of the UE 200, which may be used in relative location determination. For example, one or more accelerometers and/or one or more gyroscopes of the IMU may detect, respectively, a linear acceleration and a speed of rotation of the UE 200. The linear acceleration and speed of rotation measurements of the UE 200 may be integrated over time to determine an instantaneous direction of motion as well as a displacement of the UE 200. The instantaneous direction of motion and the displacement may be integrated to track a location of the UE 200. For example, a reference location of the UE 200 may be determined, e.g., using the SPS receiver 217 (and/or by some other means) for a moment in time and measurements from the accelerometer(s) and gyroscope(s) taken after this moment in time may be used in dead reckoning to determine present location of the UE 200 based on movement (direction and distance) of the UE 200 relative to the reference location.

The magnetometer(s) may determine magnetic field strengths in different directions which may be used to determine orientation of the UE 200. For example, the orientation may be used to provide a digital compass for the UE 200. The magnetometer may be a two-dimensional magnetometer configured to detect and provide indications of magnetic field strength in two orthogonal dimensions. Alternatively, the magnetometer may be a three-dimensional magnetometer configured to detect and provide indications of magnetic field strength in three orthogonal dimensions. The magnetometer may provide means for sensing a magnetic field and providing indications of the magnetic field, e.g., to the processor 210.

The transceiver 215 may include a wireless transceiver 240 and a wired transceiver 250 configured to communicate with other devices through wireless connections and wired connections, respectively. For example, the wireless transceiver 240 may include a wireless transmitter 242 and a wireless receiver 244 coupled to one or more antennas 246 for transmitting (e.g., on one or more uplink channels and/or one or more sidelink channels) and/or receiving (e.g., on one or more downlink channels and/or one or more sidelink channels) wireless signals 248 and transducing signals from the wireless signals 248 to wired (e.g., electrical and/or optical) signals and from wired (e.g., electrical and/or optical) signals to the wireless signals 248. Thus, the wireless transmitter 242 may include multiple transmitters that may be discrete components or combined/integrated components, and/or the wireless receiver 244 may include multiple receivers that may be discrete components or combined/integrated components. The wireless transceiver 240 may be configured to communicate signals (e.g., with TRPs and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access). WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. New Radio may use mm-wave frequencies and/or sub-6 GHz frequencies. The wired transceiver 250 may include a wired transmitter 252 and a wired receiver 254 configured for wired communication, e.g., with the network 135. The wired transmitter 252 may include multiple transmitters that may be discrete components or combined/integrated components, and/or the wired receiver 254 may include multiple receivers that may be discrete components or combined/integrated components. The wired transceiver 250 may be configured, e.g., for optical communication and/or electrical communication. The transceiver 215 may be communicatively coupled to the transceiver interface 214. e.g., by optical and/or electrical connection. The transceiver interface 214 may be at least partially integrated with the transceiver 215.

The user interface 216 may comprise one or more of several devices such as, for example, a speaker, microphone, display device, vibration device, keyboard, touch screen, etc. The user interface 216 may include more than one of any of these devices. The user interface 216 may be configured to enable a user to interact with one or more applications hosted by the UE 200. For example, the user interface 216 may store indications of analog and/or digital signals in the memory 211 to be processed by DSP 231 and/or the general-purpose processor 230 in response to action from a user. Similarly, applications hosted on the UE 200 may store indications of analog and/or digital signals in the memory 211 to present an output signal to a user. The user interface 216 may include an audio input/output (I/O) device comprising, for example, a speaker, a microphone, digital-to-analog circuitry, analog-to-digital circuitry, an amplifier and/or gain control circuitry (including more than one of any of these devices). Other configurations of an audio I/O device may be used. Also or alternatively, the user interface 216 may comprise one or more touch sensors responsive to touching and/or pressure. e.g., on a keyboard and/or touch screen of the user interface 216.

The SPS receiver 217 (e.g., a Global Positioning System (GPS) receiver) may be capable of receiving and acquiring SPS signals 260 via an SPS antenna 262. The antenna 262 is configured to transduce the wireless signals 260 to wired signals, e.g., electrical or optical signals, and may be integrated with the antenna 246. The SPS receiver 217 may be configured to process, in whole or in part, the acquired SPS signals 260 for estimating a location of the UE 200. For example, the SPS receiver 217 may be configured to determine location of the UE 200 by trilateration using the SPS signals 260. The general-purpose processor 230, the memory 211, the DSP 231 and/or one or more specialized processors (not shown) may be utilized to process acquired SPS signals, in whole or in part, and/or to calculate an estimated location of the UE 200, in conjunction with the SPS receiver 217. The memory 211 may store indications (e.g., measurements) of the SPS signals 260 and/or other signals (e.g., signals acquired from the wireless transceiver 240) for use in performing positioning operations. The general-purpose processor 230, the DSP 231, and/or one or more specialized processors, and/or the memory 211 may provide or support a location engine for use in processing measurements to estimate a location of the UE 200.

The UE 200 may include the camera 218 for capturing still or moving imagery. The camera 218 may comprise, for example, an imaging sensor (e.g., a charge coupled device or a CMOS imager), a lens, analog-to-digital circuitry, frame buffers, etc. Additional processing, conditioning, encoding, and/or compression of signals representing captured images may be performed by the general-purpose processor 230 and/or the DSP 231. Also or alternatively, the video processor 233 may perform conditioning, encoding, compression, and/or manipulation of signals representing captured images. The video processor 233 may decode/decompress stored image data for presentation on a display device (not shown), e.g., of the user interface 216.

The position device (PD) 219 may be configured to determine a position of the UE 200, motion of the UE 200, and/or relative position of the UE 200, and/or time. For example, the PD 219 may communicate with, and/or include some or all of, the SPS receiver 217. The PD 219 may work in conjunction with the processor 210 and the memory 211 as appropriate to perform at least a portion of one or more positioning methods, although the description herein may refer only to the PD 219 being configured to perform, or performing, in accordance with the positioning method(s). The PD 219 may also or alternatively be configured to determine location of the UE 200 using terrestrial-based signals (e.g., at least some of the signals 248) for trilateration, for assistance with obtaining and using the SPS signals 260, or both. The PD 219 may be configured to use one or more other techniques (e.g., relying on the UE's self-reported location (e.g., part of the UE's position beacon)) for determining the location of the UE 200, and may use a combination of techniques (e.g., SPS and terrestrial positioning signals) to determine the location of the UE 200. The PD 219 may include one or more of the sensors 213 (e.g., gyroscope(s), accelerometer(s), magnetometer(s), etc.) that may sense orientation and/or motion of the UE 200 and provide indications thereof that the processor 210 (e.g., the processor 230 and/or the DSP 231) may be configured to use to determine motion (e.g., a velocity vector and/or an acceleration vector) of the UE 200. The PD 219 may be configured to provide indications of uncertainty and/or error in the determined position and/or motion.

Figure 3:
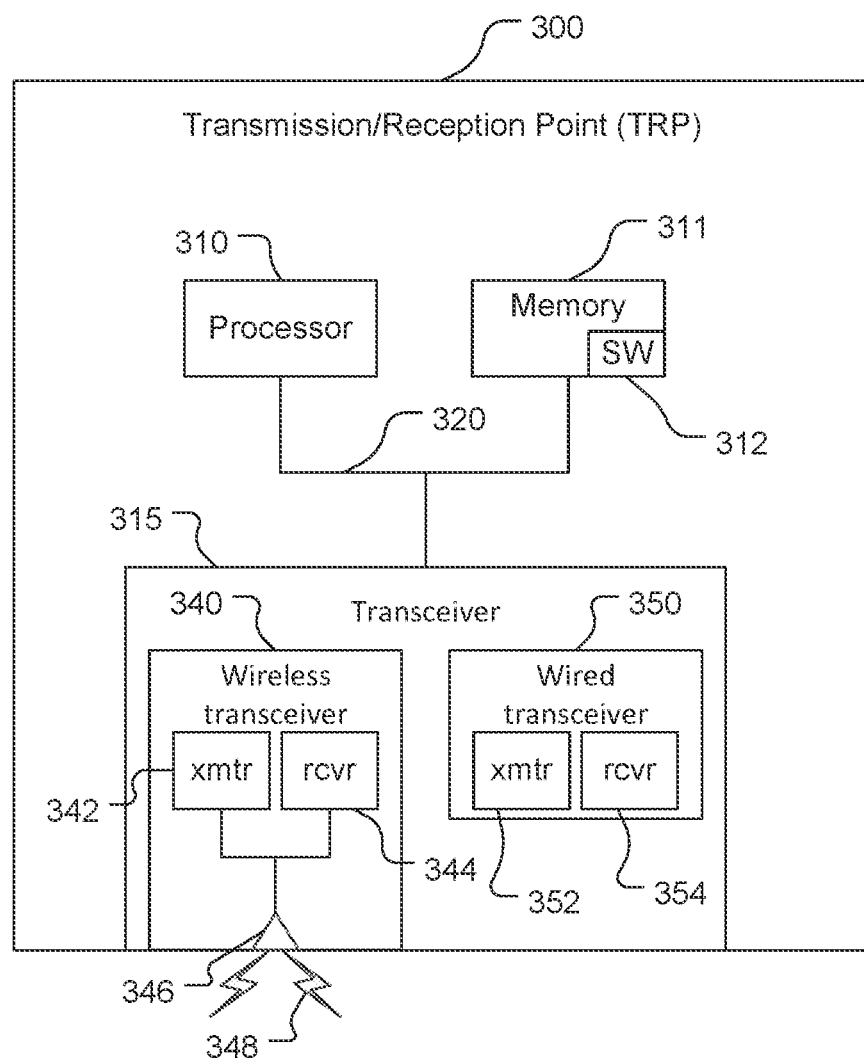
FIG. 3 is a block diagram of components of an example transmission/reception point shown in FIG. 1.

Referring also to FIG. 3, an example of a TRP 300 of the BSs 110a, 110b, 114 comprises a computing platform including a processor 310, memory 311 including software (SW) 312, and a transceiver 315. The processor 310, the memory 311, and the transceiver 315 may be communicatively coupled to each other by a bus 320 (which may be configured, e.g., for optical and/or electrical communication). One or more of the shown apparatus (e.g., a wireless interface) may be omitted from the TRP 300. The processor 310 may include one or more intelligent hardware devices, e.g., a central processing unit (CPU), a microcontroller, an application specific integrated circuit (ASIC), etc. The processor 310 may comprise multiple processors (e.g., including a general-purpose/application processor, a DSP, a modem processor, a video processor, and/or a sensor processor as shown in FIG. 2). The memory 311 is a non-transitory storage medium that may include random access memory (RAM)), flash memory, disc memory, and/or read-only memory (ROM), etc. The memory 311 stores the software 312 which may be processor-readable, processor-executable software code containing instructions that are configured to, when executed, cause the processor 310 to perform various functions described herein. Alternatively, the software 312 may not be directly executable by the processor 310 but may be configured to cause the processor 310, e.g., when compiled and executed, to perform the functions. The description may refer only to the processor 310 performing a function, but this includes other implementations such as where the processor 310 executes software and/or firmware. The description may refer to the processor 310 performing a function as shorthand for one or more of the processors contained in the processor 310 performing the function. The description may refer to the TRP 300 performing a function as shorthand for one or more appropriate components of the TRP 300 (and thus of one of the BSs 110a, 110b, 114) performing the function. The processor 310 may include a memory with stored instructions in addition to and/or instead of the memory 311. Functionality of the processor 310 is discussed more fully below.

The transceiver 315 may include a wireless transceiver 340 and/or a wired transceiver 350 configured to communicate with other devices through wireless connections and wired connections, respectively. For example, the wireless transceiver 340 may include a wireless transmitter 342 and a wireless receiver 344 coupled to one or more antennas 346 for transmitting (e.g., on one or more uplink channels and/or one or more downlink channels) and/or receiving (e.g., on one or more downlink channels and/or one or more uplink channels) wireless signals 348 and transducing signals from the wireless signals 348 to wired (e.g., electrical and/or optical) signals and from wired (e.g., electrical and/or optical) signals to the wireless signals 348. Thus, the wireless transmitter 342 may include multiple transmitters that may be discrete components or combined/integrated components, and/or the wireless receiver 344 may include multiple receivers that may be discrete components or combined/integrated components. The wireless transceiver 340 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System). AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 350 may include a wired transmitter 352 and a wired receiver 354 configured for wired communication, e.g., with the network 135 to send communications to, and receive communications from, the LMF 120, for example. The wired transmitter 352 may include multiple transmitters that may be discrete components or combined/integrated components, and/or the wired receiver 354 may include multiple receivers that may be discrete components or combined/integrated components. The wired transceiver 350 may be configured, e.g., for optical communication and/or electrical communication.

The configuration of the TRP 300 shown in FIG. 3 is an example and not limiting of the invention, including the claims, and other configurations may be used. For example, the description herein discusses that the TRP 300 is configured to perform or performs several functions, but one or more of these functions may be performed by the LMF 120 and/or the UE 200 (i.e., the LMF 120 and/or the UE 200 may be configured to perform one or more of these functions).

Figure 4:
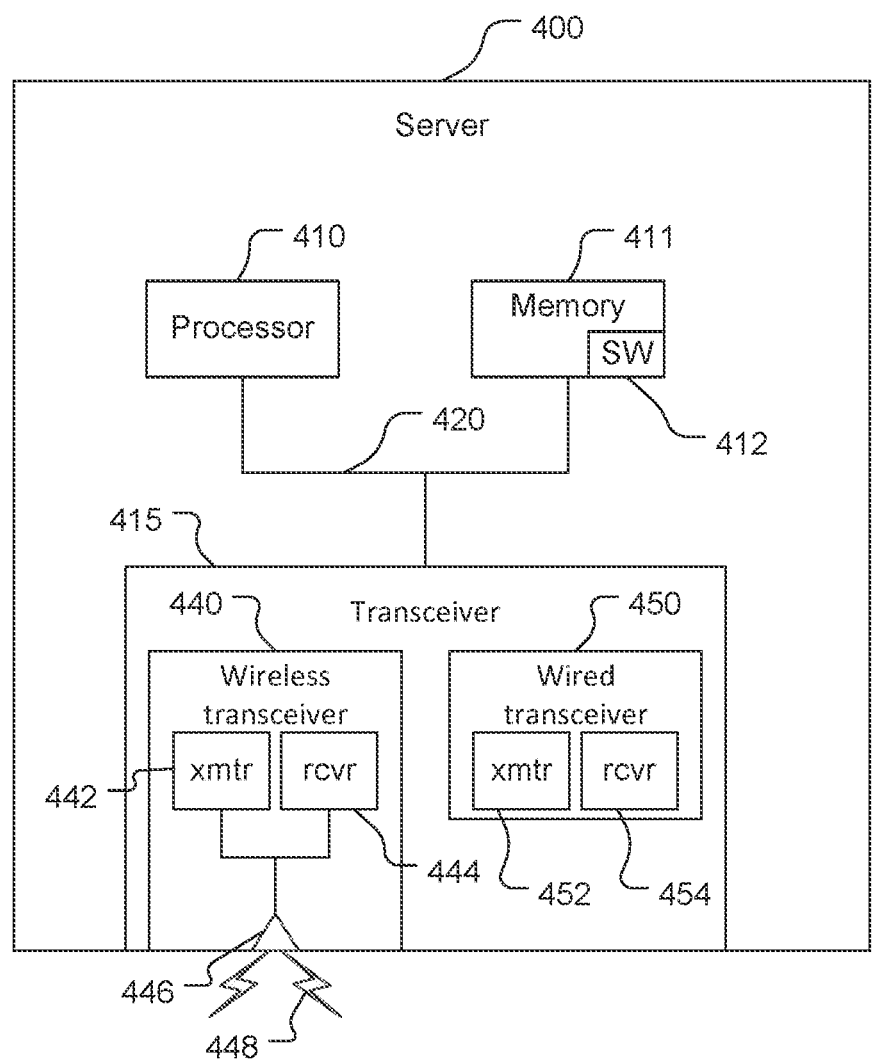
FIG. 4 is a block diagram of components of an example server shown in FIG. 1.

Referring also to FIG. 4, a server 400, which is an example of the LMF 120, comprises a computing platform including a processor 410, memory 411 including software (SW) 412, and a transceiver 415. The processor 410, the memory 411, and the transceiver 415 may be communicatively coupled to each other by a bus 420 (which may be configured, e.g., for optical and/or electrical communication). One or more of the shown apparatus (e.g., a wireless interface) may be omitted from the server 400. The processor 410 may include one or more intelligent hardware devices, e.g., a central processing unit (CPU), a microcontroller, an application specific integrated circuit (ASIC), etc. The processor 410 may comprise multiple processors (e.g., including a general-purpose/application processor, a DSP, a modem processor, a video processor, and/or a sensor processor as shown in FIG. 2). The memory 411 is a non-transitory storage medium that may include random access memory (RAM)), flash memory, disc memory, and/or read-only memory (ROM), etc. The memory 411 stores the software 412 which may be processor-readable, processor-executable software code containing instructions that are configured to, when executed, cause the processor 410 to perform various functions described herein. Alternatively, the software 412 may not be directly executable by the processor 410 but may be configured to cause the processor 410, e.g., when compiled and executed, to perform the functions. The description may refer only to the processor 410 performing a function, but this includes other implementations such as where the processor 410 executes software and/or firmware. The description may refer to the processor 410 performing a function as shorthand for one or more of the processors contained in the processor 410 performing the function. The description may refer to the server 400 performing a function as shorthand for one or more appropriate components of the server 400 performing the function. The processor 410 may include a memory with stored instructions in addition to and/or instead of the memory 411. Functionality of the processor 410 is discussed more fully below.

The transceiver 415 may include a wireless transceiver 440 and/or a wired transceiver 450 configured to communicate with other devices through wireless connections and wired connections, respectively. For example, the wireless transceiver 440 may include a wireless transmitter 442 and a wireless receiver 444 coupled to one or more antennas 446 for transmitting (e.g., on one or more downlink channels) and/or receiving (e.g., on one or more uplink channels) wireless signals 448 and transducing signals from the wireless signals 448 to wired (e.g., electrical and/or optical) signals and from wired (e.g., electrical and/or optical) signals to the wireless signals 448. Thus, the wireless transmitter 442 may include multiple transmitters that may be discrete components or combined/integrated components, and/or the wireless receiver 444 may include multiple receivers that may be discrete components or combined/integrated components. The wireless transceiver 440 may be configured to communicate signals (e.g., with the UE 200, one or more other UEs, and/or one or more other devices) according to a variety of radio access technologies (RATs) such as 5G New Radio (NR), GSM (Global System for Mobiles). UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 450 may include a wired transmitter 452 and a wired receiver 454 configured for wired communication, e.g., with the network 135 to send communications to, and receive communications from, the TRP 300, for example. The wired transmitter 452 may include multiple transmitters that may be discrete components or combined/integrated components, and/or the wired receiver 454 may include multiple receivers that may be discrete components or combined/integrated components. The wired transceiver 450 may be configured, e.g., for optical communication and/or electrical communication.

Positioning Techniques

For terrestrial positioning of a UE in cellular networks, techniques such as Advanced Forward Link Trilateration (AFLT) and Observed Time Difference Of Arrival (OTDOA) often operate in "UE-assisted" mode in which measurements of reference signals (e.g., PRS, CRS, etc.) transmitted by base stations are taken by the UE and then provided to a location server. The location server then calculates the position of the UE based on the measurements and known locations of the base stations. Because these techniques use the location server to calculate the position of the UE, rather than the UE itself, these positioning techniques are not frequently used in applications such as car or cell-phone navigation, which instead typically rely on satellite-based positioning.

A UE may use a Satellite Positioning System (SPS) (a Global Navigation Satellite System (GNSS)) for high-accuracy positioning using precise point positioning (PPP) or real time kinematic (RTK) technology. These technologies use assistance data such as measurements from ground-based stations. LTE Release 15 allows the data to be encrypted so that only the UEs subscribed to the service can read the information. Such assistance data varies with time. Thus, a UE subscribed to the service may not easily "break encryption" for other UEs by passing on the data to other UEs that have not paid for the subscription. The passing on would need to be repeated every time the assistance data changes.

In UE-assisted positioning, the UE sends measurements (e.g., TDOA, Angle of Arrival (AoA), etc.) to the positioning server (e.g., LMF/eSMLC). The positioning server has the base station almanac (BSA) that contains multiple 'entries' or 'records', one record per cell, where each record contains geographical cell location but also may include other data. An identifier of the 'record' among the multiple 'records' in the BSA may be referenced. The BSA and the measurements from the UE may be used to compute the position of the UE.

In conventional UE-based positioning, a UE computes its own position, thus avoiding sending measurements to the network (e.g., location server), which in turn improves latency and scalability. The UE uses relevant BSA record information (e.g., locations of gNBs (more broadly base stations)) from the network. The BSA information may be encrypted. But since the BSA information varies much less often than, for example, the PPP or RTK assistance data described earlier, it may be easier to make the BSA information (compared to the PPP or RTK information) available to UEs that did not subscribe and pay for decryption keys. Transmissions of reference signals by the gNBs make BSA information potentially accessible to crowd-sourcing or wardriving, essentially enabling BSA information to be generated based on in-the-field and/or over-the-top observations.

Positioning techniques may be characterized and/or assessed based on one or more criteria such as position determination accuracy and/or latency. Latency is a time elapsed between an event that triggers determination of position-related data and the availability of that data at a positioning system interface, e.g., an interface of the LMF 120. At initialization of a positioning system, the latency for the availability of position-related data is called time to first fix (TTFF), and is larger than latencies after the TFF. An inverse of a time elapsed between two consecutive position-related data availabilities is called an update rate, i.e., the rate at which position-related data are generated after the first fix. Latency may depend on processing capability, e.g., of the UE. For example, a UE may report a processing capability of the UE as a duration of DL PRS symbols in units of time (e.g., milliseconds) that the UE can process every T amount of time (e.g., T ms) assuming 272 PRB (Physical Resource Block) allocation. Other examples of capabilities that may affect latency are a number of TRPs from which the UE can process PRS, a number of PRS that the UE can process, and a bandwidth of the UE. The term PRS may refer to one or more positioning reference signals.

One or more of many different positioning techniques (also called positioning methods) may be used to determine position of an entity such as one of the UEs 105, 106. For example, known position-determination techniques include RTT, multi-RTT, OTDOA (also called TDOA and including UL-TDOA and DL-TDOA), Enhanced Cell Identification (E-CID), DL-AoD, UL-AoA, etc. RTT uses a time for a signal to travel from one entity to another and back to determine a range between the two entities. The range, plus a known location of a first one of the entities and an angle between the two entities (e.g., an azimuth angle) can be used to determine a location of the second of the entities. In multi-RTT (also called multi-cell RTT), multiple ranges from one entity (e.g., a UE) to other entities (e.g., TRPs) and known locations of the other entities may be used to determine the location of the one entity. In TDOA techniques, the difference in travel times between one entity and other entities may be used to determine relative ranges from the other entities and those, combined with known locations of the other entities may be used to determine the location of the one entity. Angles of arrival and/or departure may be used to help determine location of an entity. For example, an angle of arrival or an angle of departure of a signal combined with a range between devices (determined using signal, e.g., a travel time of the signal, a received power of the signal, etc.) and a known location of one of the devices may be used to determine a location of the other device. The angle of arrival or departure may be an azimuth angle relative to a reference direction such as true north. The angle of arrival or departure may be a zenith angle relative to directly upward from an entity (i.e., relative to radially outward from a center of Earth). E-CID uses the identity of a serving cell, the timing advance (i.e., the difference between receive and transmit times at the UE), estimated timing and power of detected neighbor cell signals, and possibly angle of arrival (e.g., of a signal at the UE from the base station or vice versa) to determine location of the UE. In TDOA, the difference in arrival times at a receiving device of signals from different sources along with known locations of the sources and known offset of transmission times from the sources are used to determine the location of the receiving device.

In a network-centric RTT estimation, the serving base station instructs the UE to scan for/receive RTT measurement signals (e.g., PRS) on serving cells of two or more neighboring base stations (and typically the serving base station, as at least three base stations are needed). The one of more base stations transmit RTT measurement signals on low reuse resources (e.g., resources used by the base station to transmit system information) allocated by the network (e.g., a location server such as the LMF 120). The UE records the arrival time (also referred to as a receive time, a reception time, a time of reception, or a time of arrival (ToA)) of each RTT measurement signal relative to the UE's current downlink timing (e.g., as derived by the UE from a DL signal received from its serving base station), and transmits a common or individual RTT response message (e.g., SRS (sounding reference signal) for positioning, i.e., UL-PRS) to the one or more base stations (e.g., when instructed by its serving base station) and may include the time difference $T_{Rx \rightarrow Tx}$ (i.e., UE $T_{Rx-Tx}$ or $UE_{Rx-Tx}$) between the ToA of the RTT measurement signal and the transmission time of the RTT response message in a payload of each RTT response message. The RTT response message would include a reference signal from which the base station can deduce the ToA of the RTT response. By comparing the difference $T_{Tx \rightarrow Rx}$ between the transmission time of the RTT measurement signal from the base station and the ToA of the RTT response at the base station to the UE-reported time difference $T_{Rx \to Tx}$, the base station can deduce the propagation time between the base station and the UE, from which the base station can determine the distance between the UE and the base station by assuming the speed of light during this propagation time.

A UE-centric RTT estimation is similar to the network-based method, except that the UE transmits uplink RTT measurement signal(s) (e.g., when instructed by a serving base station), which are received by multiple base stations in the neighborhood of the UE. Each involved base station responds with a downlink RTT response message, which may include the time difference between the ToA of the RTT measurement signal at the base station and the transmission time of the RTT response message from the base station in the RTT response message payload.

For both network-centric and UE-centric procedures, the side (network or UE) that performs the RTT calculation typically (though not always) transmits the first message(s) or signal(s) (e.g., RTT measurement signal(s)), while the other side responds with one or more RTT response message(s) or signal(s) that may include the difference between the ToA of the first message(s) or signal(s) and the transmission time of the RTT response message(s) or signal(s).

A multi-RTT technique may be used to determine position. For example, a first entity (e.g., a UE) may send out one or more signals (e.g., unicast, multicast, or broadcast from the base station) and multiple second entities (e.g., other TSPs such as base station(s) and/or UE(s)) may receive a signal from the first entity and respond to this received signal. The first entity receives the responses from the multiple second entities. The first entity (or another entity such as an LMF) may use the responses from the second entities to determine ranges to the second entities and may use the multiple ranges and known locations of the second entities to determine the location of the first entity by trilateration.

In some instances, additional information may be obtained in the form of an angle of arrival (AoA) or angle of departure (AoD) that defines a straight line direction (e.g., which may be in a horizontal plane or in three dimensions) or possibly a range of directions (e.g., for the UE from the locations of base stations). The intersection of two directions can provide another estimate of the location for the UE.

For positioning techniques using PRS (Positioning Reference Signal) signals (e.g., TDOA and RTT), PRS signals sent by multiple TRPs are measured and the arrival times of the signals, known transmission times, and known locations of the TRPs used to determine ranges from a UE to the TRPs. For example, an RSTD (Reference Signal Time Difference) may be determined for PRS signals received from multiple TRPs and used in a TDOA technique to determine position (location) of the UE. A positioning reference signal may be referred to as a PRS or a PRS signal. The PRS signals are typically sent using the same power and PRS signals with the same signal characteristics (e.g., same frequency shift) may interfere with each other such that a PRS signal from a more distant TRP may be overwhelmed by a PRS signal from a closer TRP such that the signal from the more distant TRP may not be detected. PRS muting may be used to help reduce interference by muting some PRS signals (reducing the power of the PRS signal, e.g., to zero and thus not transmitting the PRS signal). In this way, a weaker (at the UE) PRS signal may be more easily detected by the UE without a stronger PRS signal interfering with the weaker PRS signal.

Positioning reference signals (PRS) include downlink PRS (DL PRS) and uplink PRS (UL PRS) (which may be called SRS (Sounding Reference Signal) for positioning). PRS may comprise PRS resources or PRS resource sets of a frequency layer. A DL PRS positioning frequency layer (or simply a frequency layer) is a collection of DL PRS resource sets, from one or more TRPs, that have common parameters configured by higher-layer parameters DL-PRS-Positioning-FrequencyLayer, DL-PRS-ResourceSet, and DL-PRS-Resource. Each frequency layer has a DL PRS subcarrier spacing (SCS) for the DL PRS resource sets and the DL PRS resources in the frequency layer. Each frequency layer has a DL PRS cyclic prefix (CP) for the DL PRS resource sets and the DL PRS resources in the frequency layer. In 5G, a resource block occupies 12 consecutive subcarriers and a specified number of symbols. Also, a DL PRS Point A parameter defines a frequency of a reference resource block (and the lowest subcarrier of the resource block), with DL PRS resources belonging to the same DL PRS resource set having the same Point A and all DL PRS resource sets belonging to the same frequency layer having the same Point A. A frequency layer also has the same DL PRS bandwidth, the same start PRB (and center frequency), and the same value of comb size (i.e., a frequency of PRS resource elements per symbol such that for comb-N, every $N^{th}$ resource first radio access technology (rat) element is a PRS resource element).

A TRP may be configured, e.g., by instructions received from a server and/or by software in the TRP, to send DL PRS per a schedule. According to the schedule, the TRP may send the DL PRS intermittently, e.g., periodically at a consistent interval from an initial transmission. The TRP may be configured to send one or more PRS resource sets. A resource set is a collection of PRS resources across one TRP, with the resources having the same periodicity, a common muting pattern configuration (if any), and the same repetition factor across slots. Each of the PRS resource sets comprises multiple PRS resources, with each PRS resource comprising multiple Resource Elements (REs) that may be in multiple Resource Blocks (RBs) within N (one or more) consecutive symbol(s) within a slot. An RB is a collection of REs spanning a quantity of one or more consecutive symbols in the time domain and a quantity (12 for a 5G RB) of consecutive sub-carriers in the frequency domain. Each PRS resource is configured with an RE offset, slot offset, a symbol offset within a slot, and a number of consecutive symbols that the PRS resource may occupy within a slot. The RE offset defines the starting RE offset of the first symbol within a DL PRS resource in frequency. The relative RE offsets of the remaining symbols within a DL PRS resource are defined based on the initial offset. The slot offset is the starting slot of the DL PRS resource with respect to a corresponding resource set slot offset. The symbol offset determines the starting symbol of the DL PRS resource within the starting slot. Transmitted REs may repeat across slots, with each transmission being called a repetition such that there may be multiple repetitions in a PRS resource. The DL PRS resources in a DL PRS resource set are associated with the same TRP and each DL PRS resource has a DL PRS resource ID. A DL PRS resource ID in a DL PRS resource set is associated with a single beam transmitted from a single TRP (although a TRP may transmit one or more beams).

A PRS resource may also be defined by quasi-co-location and start PRB parameters. A quasi-co-location (QCL)

parameter may define any quasi-co-location information of the DL PRS resource with other reference signals. The DL PRS may be configured to be QCL type D with a DL PRS or SS/PBCH (Synchronization Signal/Physical Broadcast Channel) Block from a serving cell or a non-serving cell. The DL PRS may be configured to be QCL type C with an SS/PBCH Block from a serving cell or a non-serving cell. The start PRB parameter defines the starting PRB index of the DL PRS resource with respect to reference Point A. The starting PRB index has a granularity of one PRB and may have a minimum value of 0 and a maximum value of 2176 PRBs.

A PRS resource set is a collection of PRS resources with the same periodicity, same muting pattern configuration (if any), and the same repetition factor across slots. Every time all repetitions of all PRS resources of the PRS resource set are configured to be transmitted is referred as an "instance". Therefore, an "instance" of a PRS resource set is a specified number of repetitions for each PRS resource and a specified number of PRS resources within the PRS resource set such that once the specified number of repetitions are transmitted for each of the specified number of PRS resources, the instance is complete. An instance may also be referred to as an "occasion." A DL PRS configuration including a DL PRS transmission schedule may be provided to a UE to facilitate (or even enable) the UE to measure the DL PRS.

Multiple frequency layers of PRS may be aggregated to provide an effective bandwidth that is larger than any of the bandwidths of the layers individually. Multiple frequency layers of component carriers (which may be consecutive and/or separate) and meeting criteria such as being quasi co-located (QCLed), and having the same antenna port, may be stitched to provide a larger effective PRS bandwidth (for DL PRS and UL PRS) resulting in increased time of arrival measurement accuracy. Being QCLed, the different frequency layers behave similarly, enabling stitching of the PRS to yield the larger effective bandwidth. The larger effective bandwidth, which may be referred to as the bandwidth of an aggregated PRS or the frequency bandwidth of an aggregated PRS, provides for better time-domain resolution (e.g., of TDOA). An aggregated PRS includes a collection of PRS resources and each PRS resource of an aggregated PRS may be called a PRS component, and each PRS component may be transmitted on different component carriers, bands, or frequency layers, or on different portions of the same band.

RTT positioning is an active positioning technique in that RTT uses positioning signals sent by TRPs to UEs and by UEs (that are participating in RTT positioning) to TRPs. The TRPs may send DL-PRS signals that are received by the UEs and the UEs may send SRS (Sounding Reference Signal) signals that are received by multiple TRPs. A sounding reference signal may be referred to as an SRS or an SRS signal. In 5G multi-RTT, coordinated positioning may be used with the UE sending a single UL-SRS for positioning that is received by multiple TRPs instead of sending a separate UL-SRS for positioning for each TRP. A TRP that participates in multi-RTT will typically search for UEs that are currently camped on that TRP (served UEs, with the TRP being a serving TRP) and also UEs that are camped on neighboring TRPs (neighbor UEs). Neighbor TRPs may be TRPs of a single BTS (e.g., gNB), or may be a TRP of one BTS and a TRP of a separate BTS. For RTT positioning, including multi-RTT positioning, the DL-PRS signal and the UL-SRS for positioning signal in a PRS/SRS for positioning signal pair used to determine RTT (and thus used to determine range between the UE and the TRP) may occur close in time to each other such that errors due to UE motion and/or UE clock drift and/or TRP clock drift are within acceptable limits. For example, signals in a PRS/SRS for positioning signal pair may be transmitted from the TRP and the UE, respectively, within about 10 ms of each other. With SRS for positioning signals being sent by UEs, and with PRS and SRS for positioning signals being conveyed close in time to each other, it has been found that radio-frequency (RF) signal congestion may result (which may cause excessive noise, etc.) especially if many UEs attempt positioning concurrently and/or that computational congestion may result at the TRPs that are trying to measure many UEs concurrently.

RTT positioning may be UE-based or UE-assisted. In UE-based RTT, the UE 200 determines the RTT and corresponding range to each of the TRPs 300 and the position of the UE 200 based on the ranges to the TRPs 300 and known locations of the TRPs 300. In UE-assisted RTT, the UE 200 measures positioning signals and provides measurement information to the TRP 300, and the TRP 300 determines the RTT and range. The TRP 300 provides ranges to a location server, e.g., the server 400, and the server determines the location of the UE 200, e.g., based on ranges to different TRPs 300. The RTT and/or range may be determined by the TRP 300 that received the signal(s) from the UE 200, by this TRP 300 in combination with one or more other devices, e.g., one or more other TRPs 300 and/or the server 400, or by one or more devices other than the TRP 300 that received the signal(s) from the UE 200.

Various positioning techniques are supported in 5G NR. The NR native positioning methods supported in 5G NR include DL-only positioning methods, UL-only positioning methods, and DL+UL positioning methods. Downlink-based positioning methods include DL-TDOA and DL-AoD. Uplink-based positioning methods include UL-TDOA and UL-AoA. Combined DL+UL-based positioning methods include RTT with one base station and RTT with multiple base stations (multi-RTT).

A position estimate (e.g., for a UE) may be referred to by other names, such as a location estimate, location, position, position fix, fix, or the like. A position estimate may be geodetic and comprise coordinates (e.g., latitude, longitude, and possibly altitude) or may be civic and comprise a street address, postal address, or some other verbal description of a location. A position estimate may further be defined relative to some other known location or defined in absolute terms (e.g., using latitude, longitude, and possibly altitude). A position estimate may include an expected error or uncertainty (e.g., by including an area or volume within which the location is expected to be included with some specified or default level of confidence).

Unlink-Based Positioning Techniques

In UL-based positioning techniques (e.g., UL TDOA, single-cell RTT, multi-cell RTT) a UE transmits an uplink reference signal (typically SRS for positioning) that is measured by a TRP, and the measurement is used by a location server to determine position information (e.g., pseudorange, position estimate, etc.). How the location server uses the measurement depends on the positioning technique being implemented. Different RAT transmitters (which may be called bearers or UL bearers) may be active concurrently leading to a time-domain overlap of signal transmission. For example, in an ENDC/NSA (E-UTRAN New Radio-Dual Connectivity/Non-Standalone) mode, LTE and NR UL signal transmission may overlap in the time domain. In such cases, the UE may use a dynamic power sharing (DPS) technique to allocate transmission power to the signals. The UE may allocate requested power to a primary bearer (e.g., for the LTE signal) and allocate any remaining available power, according to the power class of the UE, to a secondary bearer (e.g., for transmission of the NR signal). For example, Power Class 2 (PC2) UEs have a maximum cumulative transmission power for UL signals of 26 dBm across radios and Power Class 3 (PC3) UEs have a maximum cumulative transmission power for UL signals of 23 dBm across radios. Table I illustrates DPS power allocation between a primary bearer and a secondary bearer of a PC3 UE.

TABLE 1

| Output power (dBm) | | |
|---|---|---|
| Primary bearer | Secondary bearer | Total |
| 23 | 8 | 23.1 |
| 22 | 15 | 22.8 |
| 21 | 18 | 22.8 |
| 20 | 20 | 23.0 |
| 18 | 21 | 22.8 |
| 15 | 22 | 22.8 |
| 8 | 23 | 23.1 |

With the primary bearer being given all requested power and the secondary bearer being allocated the residual (remaining) power, the secondary bearer may be power limited and a signal sent by the secondary bearer may not have sufficient strength to be detected (received and decoded) by a recipient entity, e.g., a base station of the RAT of the secondary bearer. This may be acceptable where the secondary bearer transmits data, e.g., because the primary bearer may also transmit data and UL HARQ (hybrid automatic repeat request) recombining may be used for the secondary bearer. A bearer is power limited if a computed transmit power (according to a power control equation) is greater than a maximum transmit power allowed due to any constraints on the power available to the bearer (e.g., the available (e.g., residual) power available to the secondary bearer is lower than the computed transmit power). The computed transmit power is a power to help ensure reception and measurement of a transmitted signal. The power control equation for determining the computed transmit power may depend on multiple factors including pathloss between a base station and a mobile device, number of resource blocks, modulation and coding scheme (MCS), and one or more network constants. The power control equation for SRS may be given by $$P_{SRS}(i) = \min\left\{ \begin{array}{c} P_{CMAX}(i) \\ P_{O\_SRS} + 10\log_{10}(M_{SRS}(i)) + \alpha PL + h(i) \end{array} \right\} dBm \quad (1)$$

where $P_{SRS}$ is the transmit power for subframe i, $P_{CMAX}(i)$ is the maximum UE transmitter power (e.g., specified by 3GPP), $P_{O\_SRS}$ is offset power, $M_{SRS}$ is the bandwidth of the SRS transmission in number of resource blocks, PL is downlink pathloss, and h is a power control adjustment. The transmitted signal may often be received and measured as long as the transmit power is within a back-off threshold amount (e.g., 2 dB or even 3 dB) of the computed transmit power, and thus a determination may be made to transmit the signal using the available power if the available power is within the back-off threshold amount of the power computed by the power control equation. If the secondary bearer is transmitting a positioning reference signal, then having insufficient transmit power for detection of the PRS may not be acceptable because UL RS may have no retransmission and a UL RS not being detected may have severe adverse impact to position accuracy/fixes. UL PRS may be given priority for transmission relative to transmission of other signals (e.g., data and/or control). For example, UL PRS of a first RAT may be given priority over UL data and/or control signals of a second RAT. One or more types of signals of the second RAT may, however, be given priority for transmission over UL PRS of the first RAT.

Figure 5:
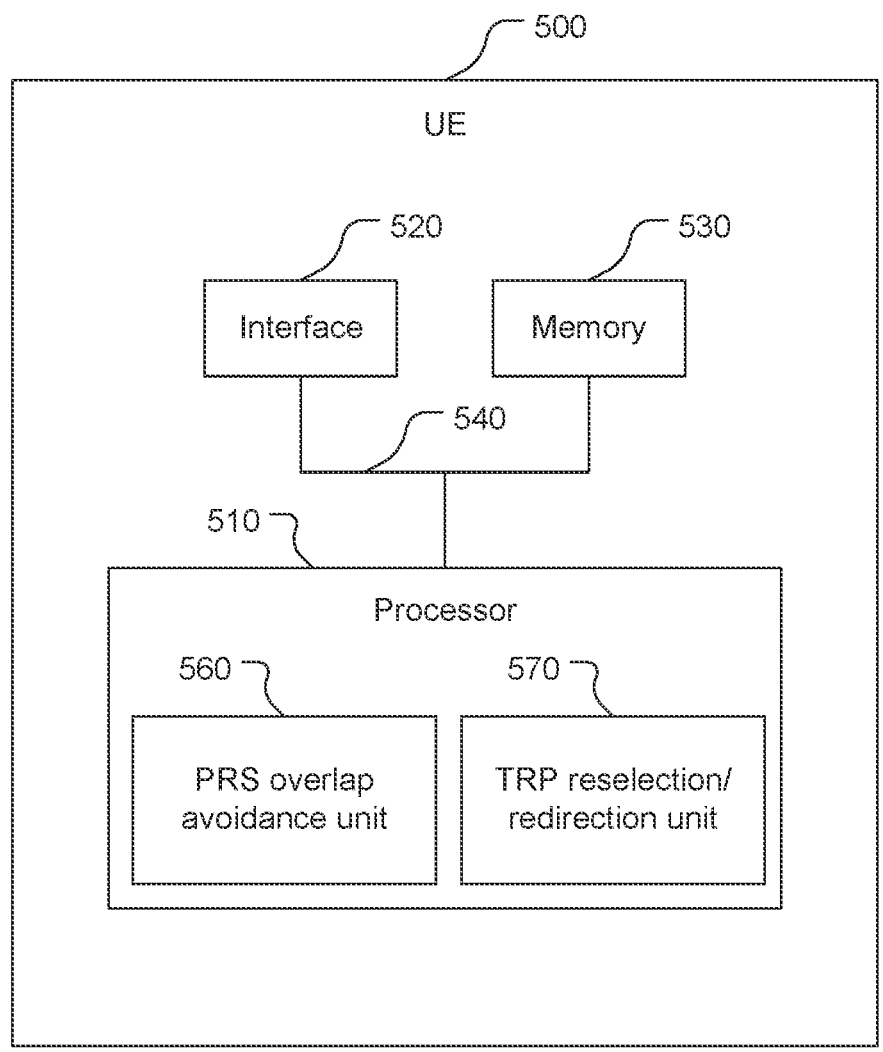
FIG. 5 is a simplified block diagram of an example user equipment.

Referring to FIG. 5, with further reference to FIGS. 1-4, a UE 500 includes a processor 510, an interface 520, and a memory 530 communicatively coupled to each other by a bus 540. The UE 500 may include some or all of the components shown in FIG. 5, and may include one or more other components such as any of those shown in FIG. 2 such that the UE 200 may be an example of the UE 500. The processor 510 may include one or more components of the processor 210. The interface 520 may include one or more of the components of the transceiver 215, e.g., the wireless transmitter 242 and the antenna 246, or the wireless receiver 244 and the antenna 246, or the wireless transmitter 242, the wireless receiver 244, and the antenna 246. Also or alternatively, the interface 520 may include the wired transmitter 252 and/or the wired receiver 254. The interface 520 may include the SPS receiver 217 and the antenna 262. The memory 530 may be configured similarly to the memory 211, e.g., including software with processor-readable instructions configured to cause the processor 510 to perform functions.

The description herein may refer only to the processor 510 performing a function, but this includes other implementations such as where the processor 510 executes software (stored in the memory 530) and/or firmware. The description herein may refer to the UE 500 performing a function as shorthand for one or more appropriate components (e.g., the processor 510 and the memory 530) of the UE 500 performing the function. The processor 510 (possibly in conjunction with the memory 530 and, as appropriate, the interface 520) includes a PRS overlap avoidance unit 560, and a TRP reselection/redirection unit 570. The PRS overlap avoidance unit 560 may be configured to determine that an unacceptable overlap (i.e., concurrent transmission) of a UL PRS and another UL signal is scheduled or is being attempted and to take appropriate action to avoid the overlap (avoid the concurrent transmission). The PRS overlap avoidance unit 560 may take one or more actions to avoid overlap of a UL PRS and another UL signal even without determining that an overlap is scheduled or being attempted or requested. The TRP reselection/redirection unit 570 may be configured to select a TRP 300 for reception of non-PRS UL signals to help ensure adequate transmit power is available for UL PRS. For example, the TRP reselection/redirection unit 570 may be configured to select a TRP 300 with a maximum UE transmit power no greater than a threshold such as 20 dBm. The PRS overlap avoidance unit 560 and/or the TRP reselection/redirection unit 570 may be configured to determine that an unacceptable overlap of UL PRS and another UL signal exists or is scheduled, e.g., that the UL PRS will not have sufficient transmit power during the overlap to be detected, e.g., based on a power control equation and a back-off threshold. The configurations of the units 560, 570 are discussed further herein.

Figure 6:
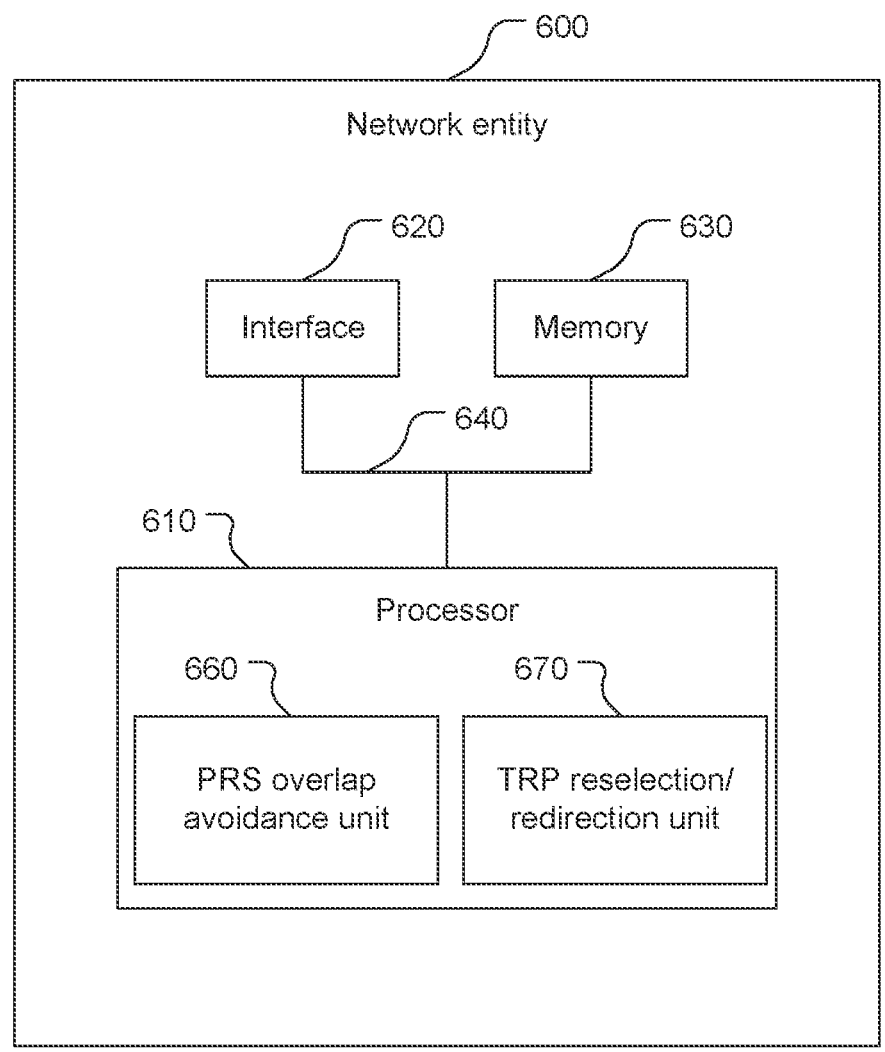
FIG. 6 is a simplified block diagram of an example of a network entity.

Referring to FIG. 6, with further reference to FIGS. 1-5, a network entity 600, which may be an example of the TRP 300 shown in FIG. 3, an example of the server 400 (e.g., an LMF) shown in FIG. 4, or a combination thereof, includes a processor 610, an interface 620, and a memory 630 communicatively coupled to each other by a bus 640. The network entity 600 may include some or all of the components shown in FIG. 6, and may include one or more other components such as any of those shown in FIG. 3 and/or FIG. 4. The interface 620 may include one or more of the components of the transceiver 315 and/or the transceiver 415. The memory 630 may be configured similarly to the memory 311 and/or the memory 411, e.g., including software with processor-readable instructions configured to cause the processor 610 to perform functions.

The description herein may refer only to the processor 610 performing a function, but this includes other implementations such as where the processor 610 executes software (stored in the memory 630) and/or firmware. The description herein may refer to the network entity 600 performing a function as shorthand for one or more appropriate components (e.g., the processor 610 and the memory 630) of the network entity 600 performing the function. The processor 610 (possibly in conjunction with the memory 630 and, as appropriate, the interface 620) includes a PRS overlap avoidance unit 660, and a TRP reselection/redirection unit 670. The PRS overlap avoidance unit 660 may be configured to determine that an unacceptable overlap (i.e., concurrent transmission) of a UL PRS and another UL signal is scheduled or is being attempted at the UE 500 and to take appropriate action to avoid the overlap (avoid the concurrent transmission). The PRS overlap avoidance unit 660 may take one or more actions to avoid overlap of a UL PRS and another UL signal from the UE 500 even without determining that an overlap is scheduled or being attempted or requested. The TRP reselection/redirection unit 670 may be configured to select a cell of a TRP 300 for reception of non-PRS UL signals from the UE 500 to help ensure adequate transmit power is available at the UE 500 for UL PRS. For example, the TRP reselection/redirection unit 670 may be configured to select cell of a TRP 300 with a maximum UE transmit power no greater than a threshold such as 20 dBm. The PRS overlap avoidance unit 660 and/or the TRP reselection/redirection unit 670 may be configured to determine that an unacceptable overlap of UL PRS and another UL signal exists or is scheduled, e.g., that the UL PRS will not have sufficient transmit power from the UE 500 during the overlap to be detected, e.g., have less than a threshold available power equal to a computed transmit power less a reception threshold power (back-off threshold) (e.g., less an absolute amount of power, e.g., 2 dBm, or a relative amount of power, e.g., 2 dB less than the computed transmit power, 80% of the computed transmit power, etc.). This determination may be based on multiple factors including a DL pathloss relevant to the UL PRS, etc., as discussed above with respect to Equation (1). The DL pathloss may be determined based on one or more of a CSI-RS (Channel State Information-Reference Signal), a PDSCH (Physical Downlink Shared CHannel) signal, an SSB (Synchronization Signal Block), etc. The configurations of the units 660, 670 are discussed further herein. The PRS overlap avoidance unit 560 and/or the PRS overlap avoidance unit 660 may be configured to determine an unacceptable overlap as discussed herein for either of the PRS overlap avoidance units 560, 660.

Overlap Avoidance

Figure 7:
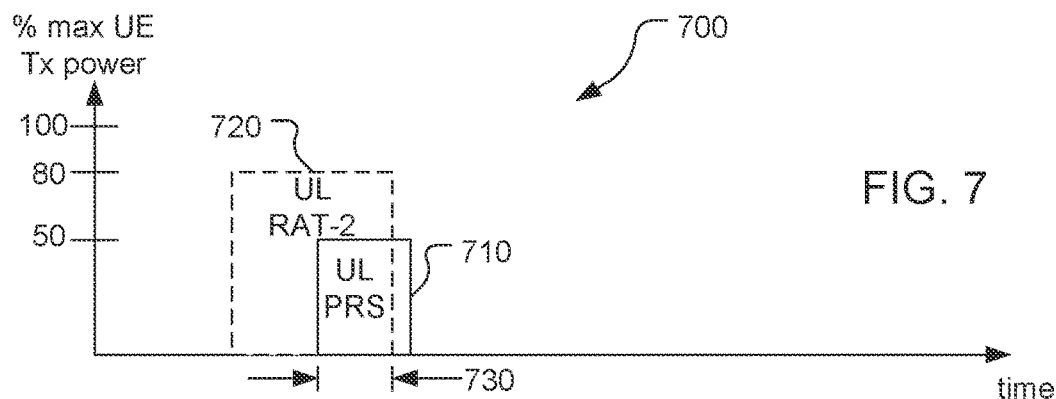
FIG. 7 is a simplified timing diagram of an uplink positioning reference signal of a first radio access technology overlapping with an uplink signal of a second radio access technology.

Referring to FIG. 7, with further reference to FIGS. 1-6, a signal timing 700 shows that a UL PRS 710 of a first RAT (RAT-1) and a UL RAT-2 signal 720 of a second RAT (RAT-2) to be transmitted by the UE 500 will overlap in time, here during a window 730. For example, the UL PRS 710 may be an NR PRS and the UL RAT-2 signal 720 may be an LTE signal conveying data or control information. The UL PRS 710 and the UL RAT-2 signal 720 may be scheduled to have the relative timing shown, or one or both of the signals 710, 720 may be as result of an on-demand request. The UL PRS 710 has a desired or scheduled transmit power of 50% of a maximum cumulative transmit power of the UE 500 and the UL RAT-2 signal 720 has a desired or scheduled transmit power of 80% of the maximum transmit power of the UE 500. The desired or scheduled amounts of transmit power may be determined, for example, to help ensure reception by corresponding TRPs 300. For example, the transmit power for each signal 710, 720 may be based on a power control equation. In this example, there is insufficient power available from the UE 500 to transmit both the UL PRS 710 and the UL RAT-2 signal 720 at the respective desired/scheduled transmit power amounts. One or both of the PRS overlap avoidance units 560, 660 may be configured to determine that such an overlap, where the combined concurrent transmit power exceeds the maximum cumulative transmit power of the UE 500, is unacceptable. One or both of the PRS overlap avoidance units 560, 660 may be configured to determine that an overlap is unacceptable where, due to the overlap, a bearer will be power limited, or power limited with an available power being less than a computed transmit power by more than a (configurable) back-off threshold amount (which may be referred to as being power limited by more than the back-off threshold amount due to the transmission overlap). One or both of the PRS overlap avoidance units 560, 660 may be configured to determine that any overlap of the signals 710, 720 is unacceptable, e.g., if the UE 500 is not configured for concurrent transmission of RAT-1 and RAT-2 signals.

Figure 8:
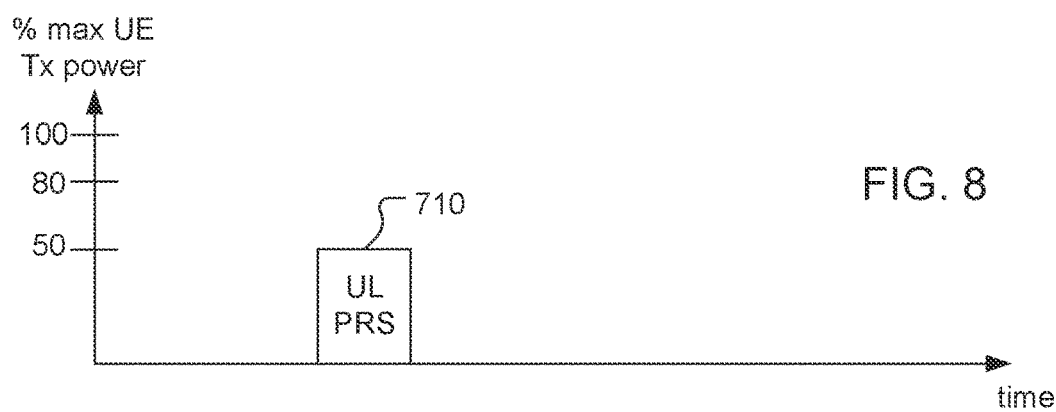
FIG. 8 is a simplified timing diagram of the positioning reference signal shown in FIG. 7 with transmission of the other uplink signal having been inhibited.

One or both of the PRS overlap avoidance units 560, 660 may be configured to avoid an unacceptable time overlap of UL transmission of the UL PRS 710 and the UL RAT-2 signal 720, i.e., of an uplink PRS according to one RAT and an uplink signal according to another RAT. For example, referring also to FIG. 8, the PRS overlap avoidance unit 560 may be configured not to transmit the UL RAT-2 signal 720 containing data or control information where the UL RAT-2 signal 720 (e.g., LTE data and/or control) unacceptably overlaps with the UL PRS 710 (e.g., NR SRS for positioning). Thus, as shown in FIG. 8, the PRS overlap avoidance unit 560 may only transmit the UL PRS 710 and may drop or discard the UL RAT-2 signal 720.

Figure 9:
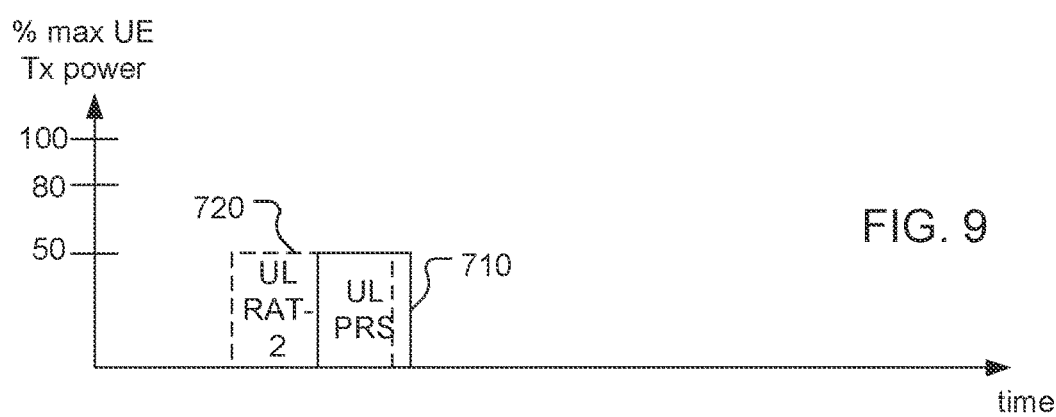
FIG. 9 is a simplified timing diagram of the signals shown in FIG. 7 with static power sharing implemented.

As another example of overlap avoidance, referring also to FIG. 9, the PRS overlap avoidance unit 560 may be configured to set (e.g., change) a power sharing mode of the UE 500 to "static". For example, in response to the UE 500 entering a positioning session (e.g., upon receiving a positioning request or initiation of a position determination technique), the PRS overlap avoidance unit 560 may send a tracking area update (TAU) to set "dynamic power sharing" to false, in which case the UE 500 operates in static power sharing mode, e.g., allocating a fixed amounts of power to respective RATs, e.g., 50%, of the maximum cumulative transmission power of the UE to each of RAT-1 and RAT-2 (e.g., 20 dBm for a PC3 UE and 23 dBm for a PC2 UE). In this example, as shown in FIG. 9, the power allocated to the UL RAT-2 signal 720 is 50% of the maximum cumulative transmit power of the UE 500, thus limiting the power of the signal 720 to 50% instead of the desired 80% for the signal 720. The PRS overlap avoidance unit 560 may be configured to set the power sharing mode of the UE 500 to the static mode also based on (i.e., in further response to) the overlap being unacceptable, or may be configured to set the power sharing mode of the UE 500 to the static mode based only on the positioning session, regardless of whether any overlap exists and/or regardless of whether any overlap is acceptable or not. The PRS overlap avoidance unit 560 may be configured to set the power sharing mode of the UE 500 based on a manufacturer preference, based on geography (e.g., a serving cell of the UE 500), etc. As shown in FIG. 9, the signals 710, 720 are concurrently transmitted by the UE 500 because the static power sharing mode ensures that the cumulative power for the signals 710, 720 does not exceed the maximum cumulative transmit power available at the UE 500.

Figure 10:
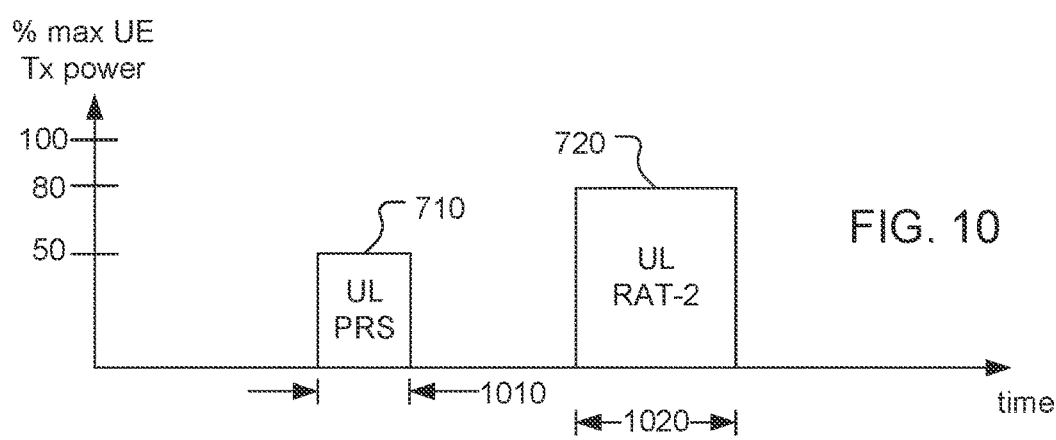
FIG. 10 is a simplified timing diagram of the signal shown in FIG. 7 having been rescheduled not to overlap in time.

As another example of overlap avoidance, referring also to FIG. 10, the PRS overlap avoidance unit 560 may be configured to set (e.g., change) operation of the UE 500 to single UL operation, at least with respect to the RAT-1 and RAT-2 combination (e.g., the ENDC combination) and indicate this operation to the network, e.g., the network entity 600. For example, the PRS overlap avoidance unit 560 may send an information element (IE) as part of a capability message to a network entity indicating single UL operation of the UE 500. The network entity 600, e.g., the PRS overlap avoidance unit 660, of one or more network entities may respond to the single UL operation indication by coordinating schedules of respective UL signals to help ensure that the signals 710, 720 do not unacceptably overlap, e.g., being transmitted by the UE 500 during non-overlapping time windows 1010, 1020, respectively, as shown in FIG. 10. The UE 500 may transmit the UL RAT-2 signal with the full desired transmission power, in this example, 80% of the maximum cumulative transmission power of the UE 500. The PRS overlap avoidance unit 560 may be configured to set the operation to single UL operation also based on (i.e., in further response to) the overlap being unacceptable, or may be configured to set the power sharing mode of the UE 500 to the static mode based only on the positioning session, regardless of whether any overlap exists and/or regardless of whether any overlap is acceptable or not. The PRS overlap avoidance unit 560 may be configured to set the operation to single UL operation based on a manufacturer preference, based on geography (e.g., a serving cell of the UE 500), etc. The PRS overlap avoidance unit 560 may be configured to set the operation to static power sharing and in response to the transmit power for the UL PRS being insufficient in the static power sharing mode, to set the operation of the UE 500 to single UL operation. The PRS overlap avoidance unit 560 may update the operation mode of the UE 500 in response to termination of the positioning session, e.g., to a default operation mode that may not be a single-UL operation mode.

Figure 11:
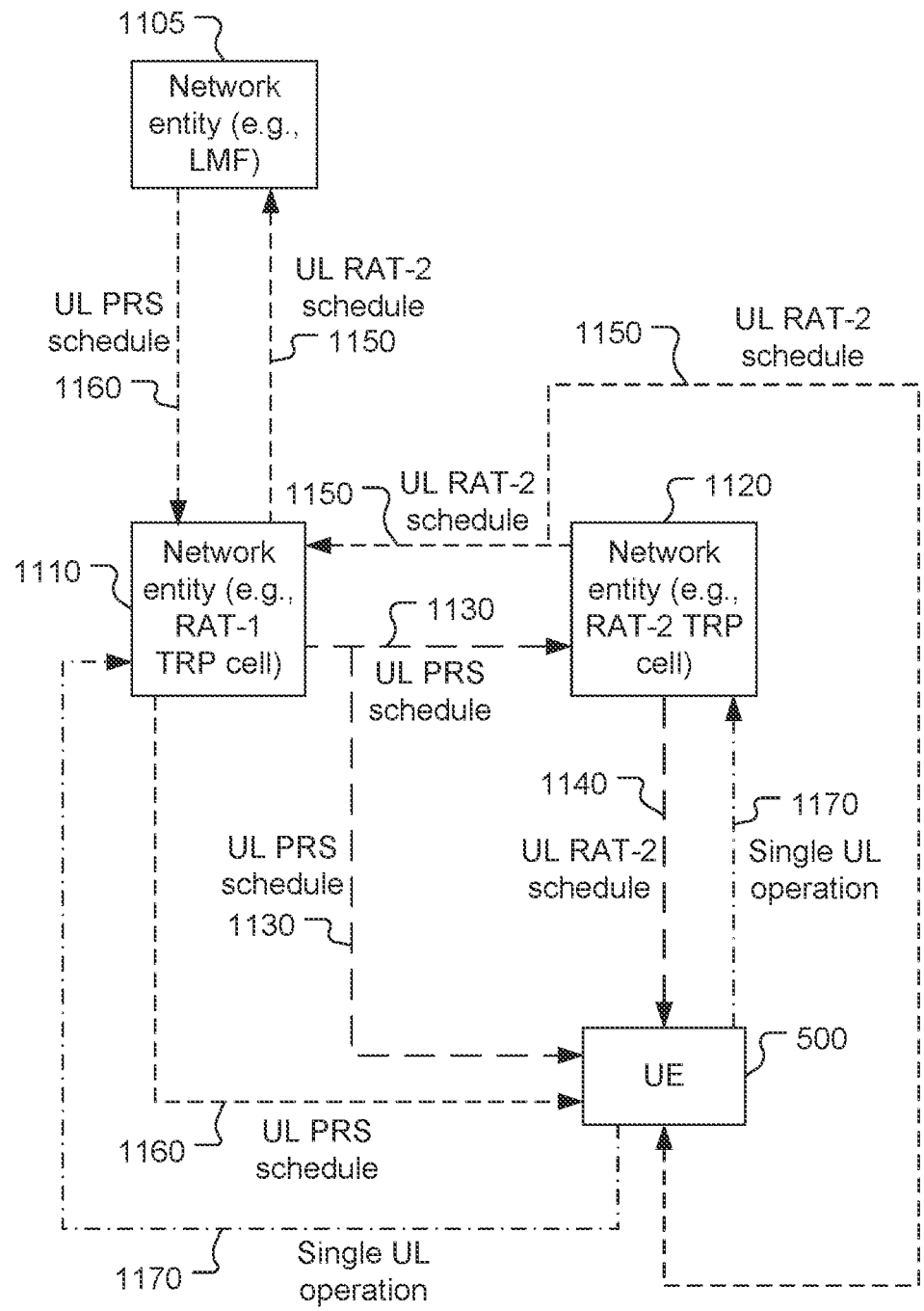
FIG. 11 is a simplified diagram of network entities and a user equipment, and messaging therebetween.

Referring to FIG. 11, with further reference to FIGS. 3-7 and 10, one or more network entities 1105, 1110, 1120 may be configured to coordinate UL signal scheduling to ensure that an unacceptable overlap of the UL PRS 710 and the UL RAT-2 signal 720 does not occur. For example, the network entity 1110, that is an example of a cell of the TRP 300, and the network entity 1120, that is another example of a cell of the TRP 300, and possibly the network entity 1105 (that is an example of the server 400, e.g., an LMF), may coordinate to avoid unacceptable UL signal overlap. The network entity 1110 may be a TRP configured to communicate with the UE 500 in accordance with the first RAT (RAT-1), e.g., NR, and the network entity 1120 may be a TRP configured to communicate with the UE 500 in accordance with the second RAT (RAT-2), e.g., LTE. The network entities 1110, 1120 are configured to communicate with each other through an X2 interface. The network entities 1110, 1120 may be co-located, may be portions of a single physical entity, or may be physically separate devices.

A network entity may be configured to determine that overlapping uplink transmission is unacceptable in one or more of multiple ways. For example, the PRS overlap avoidance unit 660 may be configured to analyze UL transmission schedules, determine times of overlap of those schedules, and available power for transmitting PRS during the times of overlap. The PRS overlap avoidance unit 660 may be configured to determine proactively that the scheduled overlap is unacceptable based on the available power for PRS transmission being more than a back-off threshold less than a computed transmit power for the PRS, e.g., according to a power control equation such as Equation (1). That is, the power to ensure receipt of the PRS is more than the back-off power more than the available power for transmitting the PRS. As another example, the PRS overlap avoidance unit 660 may be configured to determine reactively that an expected overlapping UL PRS transmission from the UE 500 is not received, e.g., a scheduled UL PRS transmission from the UE 500, that is scheduled to overlap with another UL transmission, is not received by the network entity 600 or another entity that informs the network entity 600 of the lack of receipt of the expected UL PRS. The PRS overlap avoidance unit 660 may conclude that the UL overlap is unacceptable in view of the lack of receipt of the UL PRS. Still other techniques may be used to determine that overlapping uplink transmission is unacceptable.

In a first example of coordinating to avoid unacceptable UL signal overlap, the network entity 1110 may send a UL PRS schedule 1130 for the UE 500 to the network entity 1120 and to the UE 500. The network entity 1120, e.g., the PRS overlap avoidance unit 660, may use the UL PRS schedule 1130 for the UE 500 to determine, proactively and/or reactively (e.g., in response to lack of receipt of UL PRS), a UL RAT-2 schedule 1140 for the UE 500 to avoid unacceptable UL signal overlaps by the UE 500, e.g., such that the UL RAT-2 signal 720 does not overlap with the UL PRS 710, e.g., as shown in FIG. 10. The PRS overlap avoidance unit 660 may send the determined UL RAT-2 schedule 1140 to the UE 500. The UE 500 may implement the UL PRS schedule 1130 and the UL RAT-2 schedule 1140 with the UL PRS not unacceptably overlapping with the UL RAT-2 signal. The UL PRS of the coordinated schedules may not overlap at all with UL RAT-2 signals or may overlap only where desired transmission power of the UL PRS may be used, e.g., to help ensure detection of the UL PRS (e.g., the UL PRS transmission power being within a threshold amount of a power computed by a power control equation).

In a second example of coordinating to avoid unacceptable UL signal overlap, the network entity 1120 may send a UL RAT-2 schedule 1150 for the UE 500 to the network entity 1110 and to the UE 500. The network entity 1110 may send the UL RAT-2 schedule 1150 to the network entity 1105. The network entity 1105 (e.g., the PRS overlap avoidance unit 660) may use the UL RAT-2 schedule 1150 for the UE 500 to determine, proactively and/or reactively (e.g., in response to lack of receipt of UL PRS), a UL PRS schedule 1160 for the UE 500 to avoid unacceptable UL signal overlaps by the UE 500, e.g., such that the UL RAT-2 signal 720 does not overlap with the UL PRS 710, e.g., as shown in FIG. 10. The network entity 1105 may send the UL PRS schedule 1160 (e.g., parameters of the schedule) to the network entity 1110, and the network entity 1110 may send the UL PRS schedule 1160 to the UE 500. The UE 500 may send UL PRS and UL RAT-2 signals in accordance with the schedules 1150, 1160.

In a third example of coordinating to avoid unacceptable UL signal overlap, the UE 500 may send a single UL operation indication 1170, indicating that the UE 500 will transmit using only one RAT at a time, to the network entities 1110, 1120. The network entities 1110, 1120 may coordinate to determine the UL PRS schedule and the UL RAT-2 schedule to avoid unacceptable overlap. For example, the network entities 1110, 1120 may operate in accordance with the first example to avoid unacceptable UL signal overlap discussed above or the second example to avoid unacceptable UL signal overlap discussed above, to determine signal scheduling without overlap, e.g., as shown in FIG. 10.

TRP Reselection or Redirection

A TRP 300 may indicate a maximum transmission power (called a p-max value) for UEs to use when sending signals to a cell of the TRP 300 under any scenario (e.g., no matter a type or purpose of a signal). For example, a TRP 300 may broadcast a p-max value in a SIB (System Information Block) and different TRP cells may have different values of p-max, e.g., as some TRP cells may have coverage areas where a lower UE transmit power will be sufficient for detection by the TRPs of signals transmitted by UEs, and/or TRPs may be located in areas where UE signal transmission power is desired to be kept low to avoid interference with other signals, etc. The value of p-max is typically on the order of a power class of a UE, e.g., with typical p-max values being 26 dBm, 23 dBm. or 20 dBm. It has been found that 20 dBm of transmit power for UL PRS is most often sufficient for detection by a TRP.

Figure 12:
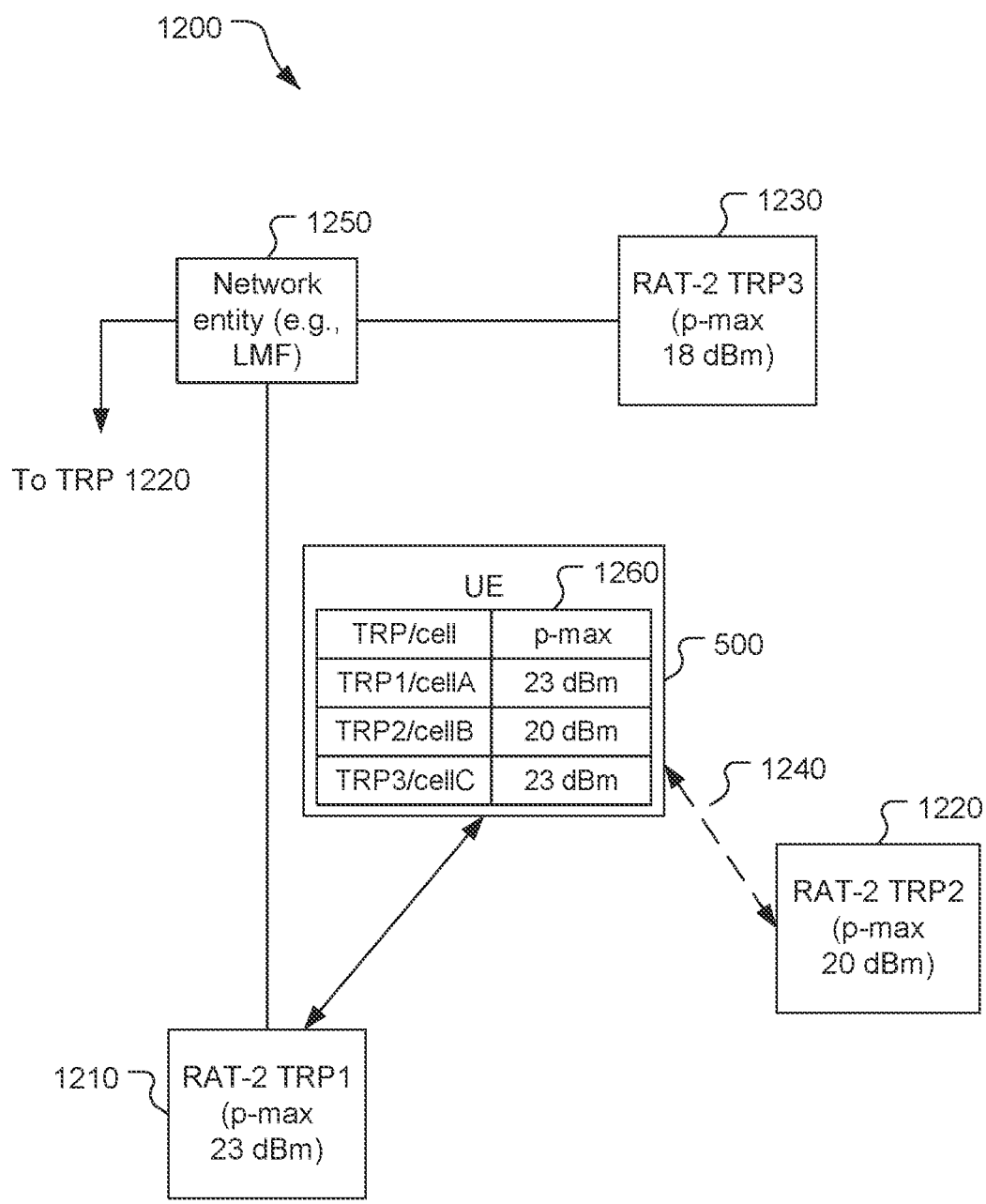
FIG. 12 is a simplified diagram of transmission/reception point reselection by a user equipment.

Referring to FIG. 12, with further reference to FIGS. 1-7 and 9, in an environment 1200 the UE 500 may be connected with a TRP 1210 as a serving TRP for communication in accordance with RAT-2 (e.g., LTE), while other TRPs 1220, 1230 may be within communication range of the UE 500. The TRPs 1210, 1220, 1230 are examples of the TRP 300. In this example, the TRPs 1210, 1220, 1230 have, and broadcast, respective p-max values of 23 dBm, 20 dBm, and 18 dBm for RAT-2 communications with respective cells. Each of the TRPs 1210, 1220, 1230 may have more than one cell, but p-max for only one cell is shown for each TRP for simplicity of the figure.

The TRP reselection/redirection unit 570 may be configured to select a cell of a TRP 300 that limits transmit power for RAT-2 communications from the UE 500 to no more than a first threshold. The first threshold amount may be preprogrammed or determined by the TRP reselection/redirection unit 570 that will allow transmit power for UL PRS to be of at least a second threshold amount, e.g., to help ensure detection of the UL PRS. For example, the TRP reselection/redirection unit 570 may be configured to determine the second threshold amount as an amount that is within a threshold of a transmit power computed by a power control equation. The TRP reselection/redirection unit 570 may be configured to respond to initiation of a positioning session, and a cell of a present RAT-2 serving TRP having a p-max value above the first threshold, to search for a TRP cell having a p-max value no greater than the first threshold. The TRP reselection/redirection unit 570 may be configured to search for a TRP cell with a p-max value no greater than the first threshold also based on (i.e., in further response to) determining that an unacceptable overlap of UL PRS and a UL RAT-2 signal is scheduled or is being requested. The TRP reselection/redirection unit 570 may be configured to reselect a TRP cell having a p-max no greater than the first threshold in response to the present serving TRP cell for RAT-2 communication having a p-max value greater than the first threshold. The TRP reselection/redirection unit 570 may be configured to determine whether the to search for a TRP cell with a p-max value no greater than the first threshold based on an unacceptable overlap in addition to a positioning session based on a type of the positioning session. For example, the TRP reselection/redirection unit 570 may be configured to try to use a TRP cell (either present serving TRP cell or reselected TRP cell) with a p-max no greater than the first threshold without regard to overlap of UL PRS and other UL signals based on the positioning session being a high-priority positioning session (e.g., for an emergency call). The TRP reselection/redirection unit 570 may be configured to try to use a TRP cell (either present serving TRP cell or reselected TRP cell) with a p-max no greater than the first threshold based on initiation of the positioning session and based on unacceptable overlap of UL PRS and other UL based on the positioning session being a low-priority positioning session (e.g., for consumer asset tracking). For idle mode reselections where multiple TRP cells satisfy selection criteria (S-criteria), the TRP reselection/redirection unit 570 may prioritize the TRP cell(s) with p-max set to no greater than the first threshold (and may prioritize based on the p-max value, e.g., prioritized in reverse order of p-max value, with TRP cells having lower p-max values prioritized higher than TRP cells having higher p-max values). The same may be done for inter-frequency, intra-frequency, and inter-RAT scenarios to reselect/redirect to a RAT-2 TRP cell with a p-max value no greater than the first threshold, e.g., to guarantee at least the second threshold power for UL PRS. In the example shown in FIG. 12, with the UE 500 being a PC3 UE, and the first threshold being 20 dBm, the TRP reselection/redirection unit 570 may reselect a cell of the TRP 1220 to be the serving TRP cell for the UE 500 for RAT-2 communication as indicated by a dashed line 1240.

The UE 500 may store p-max values of TRP cells in the memory 530 to facilitate TRP cell selection. For example, a table 1260 of p-max values of TRP cells may be stored in a UE database, an acquisition database (ACQ DB), or in EFS (Encrypted File System) memory. The TRP reselection/redirection unit 570 may thus determine the p-max values, e.g., of frequently-used TRP cells, without having to decode signals indicating the p-max values. This may speed operation of the UE 500, reducing positioning latency and/or increasing positioning accuracy.

Also or alternatively, the TRP resclection/redirection unit 670, e.g., of a TRP or a network entity 1250, may be configured to cause reselection of a cell of a TRP 300 that limits transmit power for RAT-2 communications from the UE 500 to no more than the first threshold. The TRP reselection/redirection unit 670 may be configured to respond to one or more conditions as discussed above and to perform functions similar to those discussed above with respect to the TRP reselection/redirection unit 570 to select a cell of a TRP and/or to cause reselection of a cell of a TRP. The TRP reselection/redirection unit 670 may be configured to obtain headroom information from one or more power headroom reports (PHR) to determine the present transmit power available at the UE 500 for each RAT of the ENDC. The TRP reselection/redirection unit 670 may be configured to respond to a determination that the UL PRS in RAT-1 is power limited (e.g., by more than a threshold amount) by triggering redirection of the UE 500 to a cell of a RAT-2 TRP with a p-max value no greater than the first threshold. The TRP reselection/redirection unit 670 may be configured to find the appropriate TRP cell and cause the UE 500 to reselect the determined TRP cell or may cause handover to the selected TRP cell. This reselection/redirection may help ensure that the RAT-1 UL PRS has sufficient transmit power to be detected.

The first threshold amount may be pre-programmed or determined by the TRP reselection/redirection unit 670 to allow transmit power for UL PRS from the UE 500 to be of at least the second threshold amount, e.g., to help ensure detection of the UL PRS. For example, the TRP reselection/redirection unit 670 may be configured to determine the second threshold amount as an amount greater than a transmit power, computed by a power control equation, minus a threshold power. The threshold power may be an absolute power (e.g., 2 dBm) or a relative power (e.g., 20% of the computed transmit power, such that the second threshold is 80% of the computed transmit power). The TRP reselection/redirection unit 570 may be configured to respond to initiation of a positioning session, and a present RAT-2 serving TRP cell having a p-max value above the first threshold, to search for a TRP cell having a p-max value no greater than the first threshold. The TRP reselection/redirection unit 570 may be configured to search for a TRP cell with a p-max value no greater than the first threshold also based on (i.e., in further response to) determining that an unacceptable overlap of UL PRS and a UL RAT-2 signal is scheduled or is being requested. The TRP reselection/redirection unit 570 may be configured to reselect a TRP cell having a p-max no greater than the first threshold in response to the present serving TRP cell for RAT-2 communication having a p-max value greater than the first threshold. In the example shown in FIG. 12, with the UE 500 being a PC3 UE, and the first threshold being 20 dBm, the TRP reselection/redirection unit 570 may reselect a cell of the TRP 1220 to be the serving TRP for the UE 500 for RAT-2 communication as indicated by a dashed line 1240.

Operation

Figure 13:
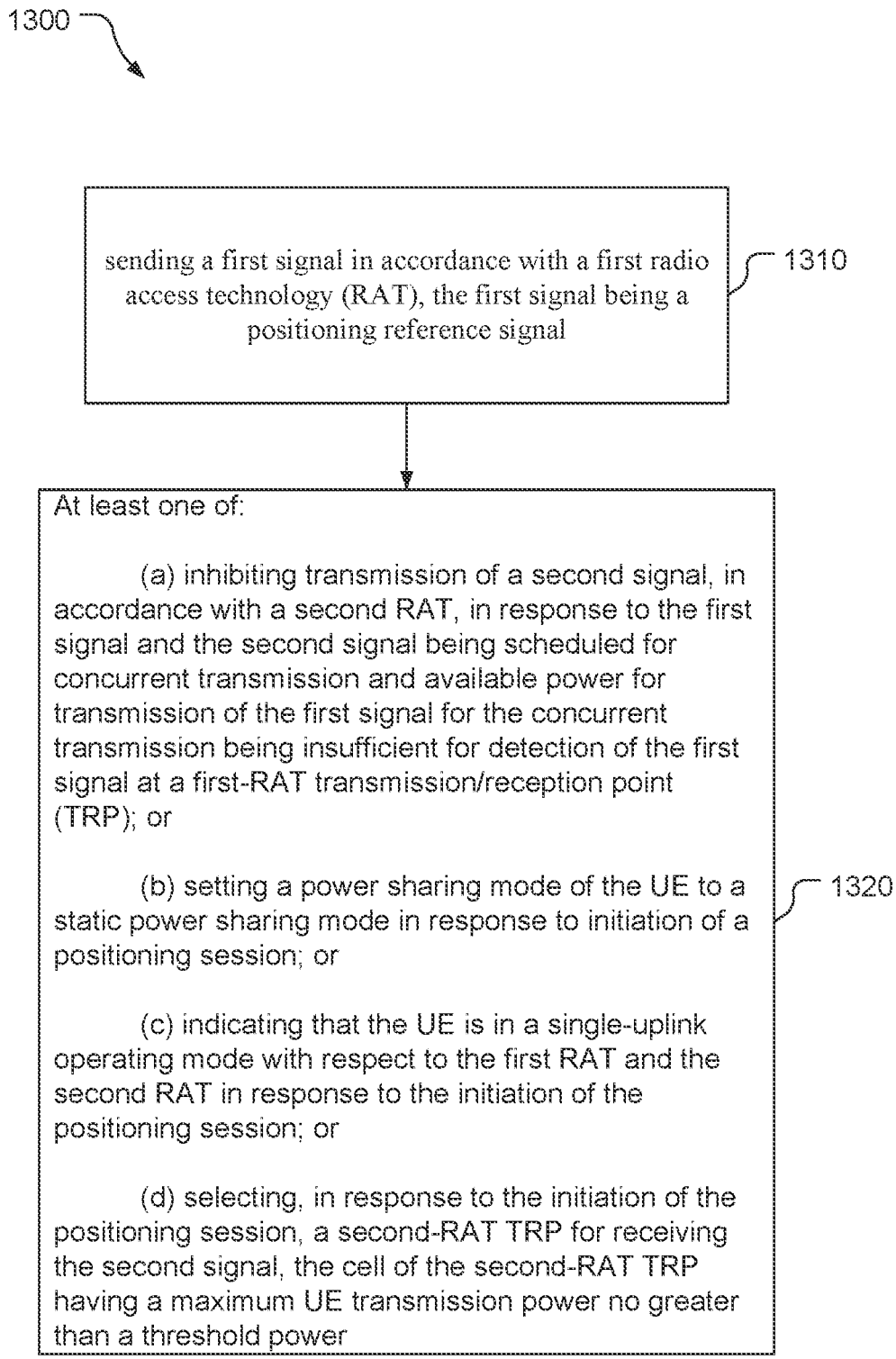
FIG. 13 is a block flow diagram of a method for controlling uplink signal transmission.

Referring to FIG. 13, with further reference to FIGS. 1-12, a method 1300 for controlling uplink signal transmission includes the stages shown. The method 1300 is, however, an example only and not limiting. The method 1300 may be altered. e.g., by having stages added, removed, rearranged, combined, performed concurrently, and/or having single stages split into multiple stages.

At stage 1310, the method 1300 includes sending a first signal in accordance with a first radio access technology (RAT), the first signal being a positioning reference signal. For example, the processor 510 sends a PRS signal via the interface 520 using a first RAT, e.g., NR. The processor 510, possibly in combination with the memory 530, in combination with the interface 520 (e.g., the wireless transmitter 242 and the antenna 246) may comprise means for sending the first signal.

At stage 1320, the method 1300 includes at least one of: (a) inhibiting transmission of a second signal, in accordance with a second RAT, in response to the first signal and the second signal being scheduled for concurrent transmission and available power for transmission of the first signal for the concurrent transmission being insufficient for detection of the first signal at a first-RAT transmission/reception point (TRP); or (b) setting a power sharing mode of the UE to a static power sharing mode in response to initiation of a positioning session; or (c) indicating that the UE is in a single-uplink operating mode with respect to the first RAT and the second RAT in response to the initiation of the positioning session; or (d) selecting, in response to the initiation of the positioning session, a cell of a second-RAT TRP for receiving the second signal, the cell of the second-RAT TRP having a maximum UE transmission power no greater than a threshold power. For example, regarding element (a), the PRS overlap avoidance unit 560 may discard or ignore a signal of a second RAT (e.g., LTE) that is scheduled (or otherwise queued or requested) to be transmitted at least partially overlapping in time with the PRS signal where the overlap of the PRS signal and the second-RAT signal would be unacceptable (e.g., not allowed at all, or desired cumulative transmit would exceed a maximum cumulative transmit power of the UE 500). The processor 510, e.g., the PRS overlap avoidance unit 560, possibly in combination with the memory 530 may comprise means for inhibiting transmission of the second signal. Regarding element (b), the PRS overlap avoidance unit 560 may set the power sharing mode to static (e.g., set a dynamic power sharing mode to "false") based on initiation of a positioning session, and possibly also based on an overlap of the first and second signals being unacceptable (e.g., there being insufficient available power (e.g., while in the static power sharing mode) for the first signal for detection of the first signal by a corresponding TRP 300). The processor 510, e.g., the PRS overlap avoidance unit 560, possibly in combination with the memory 530 may comprise means for setting a power sharing mode of the UE 500 to static. Regarding element (c), the PRS overlap avoidance unit 560 may indicate that the UE is in a single-uplink operating mode based on initiation of a positioning session, and possibly also based on an overlap of the first and second signals being unacceptable (e.g., there being insufficient available power (e.g., while in the static power sharing mode) for the first signal for detection of the first signal by a corresponding TRP 300). The PRS overlap avoidance unit 560 may indicate single-uplink operation mode, e.g., implicitly (by indicating single-uplink operating mode generally) or explicitly. The PRS overlap avoidance unit may further cause the UE 500 to operate in the single-uplink operating mode, although the UE 500 may operate in a multiple-RAT operating mode (e.g., ENDC/NSA), with the indication of single-uplink operating mode serving to result in non-overlapping UL signals. The processor 510, e.g., the PRS overlap avoidance unit 560, possibly in combination with the memory 530, in combination with the interface 520 (e.g., the wireless transmitter 242 and the antenna 246) may comprise means for indicating that the UE is in a single-uplink operating mode. Regarding element (d), based on initiation of a positioning session the TRP reselection/redirection unit 570 may select a TRP cell for receiving communications according to the second RAT where the TRP cell has a p-max value lower than a predetermined threshold, or perhaps below a threshold to allow sufficient power for transmission of the PRS for the PRS to be detected. The TRP cell may also be selected based on an overlap of the first and second signals being unacceptable (e.g., there being insufficient available power (e.g., while in the static power sharing mode) for the first signal for detection of the first signal by a corresponding TRP 300). The TRP reselection/redirection unit 570 may determine the p-max values of TRP cells using signals from one or more of the TRP cells and/or stored p-max information for one or more of the TRP cells. The processor 510, e.g., the TRP reselection/redirection unit 570, possibly in combination with the memory 530, possibly in combination with the interface 520 (e.g., the wireless receiver 244 and the antenna 246) may comprise means for selecting the cell of the second-RAT TRP.

Implementations of the method 1300 may include one or more of the following features. For example, the method 1300 may comprise inhibiting transmission of the second signal, and comprise determining that the available power for transmission of the first signal for the concurrent transmission is less than a pathloss between the first-RAT TRP and the UE in order to determine that the available power for transmission of the first signal for the concurrent transmission is insufficient for detection of the first signal at the first-RAT TRP. The PRS overlap avoidance unit 560 may determine the power scheduled or desired or otherwise allocated to transmission of the second signal and that remaining power of the cumulative maximum transmit power of the UE 500 is insufficient to ensure detection of the PRS because the remaining power is below a DL pathloss, and thus an expected UL pathloss to be encountered by the PRS. The processor 510, possibly in combination with the memory 530 may comprise means for determining that the available power for transmission of the first signal is insufficient. As another example implementation, the method 1300 may comprise both elements (b) and (c) performed in response to initiation of a positioning session, and possibly also in response to an overlap of the first and second signals being unacceptable (e.g., there being insufficient available power for the first signal for detection of the first signal by a corresponding TRP 300). In another example implementation, the method 1300 comprises selecting the cell of the second-RAT TRP that has the maximum UE transmission power no greater than the threshold power in response to the initiation of the positioning session and in response to the available power for transmission of the first signal for the concurrent transmission being insufficient for detection of the first signal at the first-RAT TRP. In another example implementation, the method 1300 may comprise selecting the second-RAT TRP in response to the initiation of the positioning session and a priority level of the positioning session. For example, the TRP reselection/redirection unit 570 may select the cell of the second-RAT TRP based on an emergency positioning session being activated, regardless of whether any first signal/second signal overlap or whether such overlap is unacceptable. This may help avoid reselection during the positioning session, thus improving positioning latency.

Also or alternatively, implementations of the method 1300 may include one or more of the following features. For example, the threshold power may be a first threshold power, and the method 1300 may comprise at least one of: setting the power sharing mode to the static power sharing mode in response to the available power for transmission of the first signal for the concurrent transmission being below a second threshold power that is equal to a transmit power, determined in accordance with a power control equation, minus a third threshold power; or indicating that the UE is in the single-uplink operating mode in response to the available power for transmission of the first signal for the concurrent transmission being below the second threshold power; or selecting the second-RAT TRP in response to the available power for transmission of the first signal for the concurrent transmission being below the second threshold power. The processor 510 may perform element (a), or (b), or (c) based on the available transmission power being more than the back-off threshold lower than the transmit power computed by a power control equation, e.g., Equation (1), e.g., based on remaining transmission power (in view of transmission power of another signal, e.g., an LTE signal) being insufficient to ensure detection of the PRS. The second threshold may be, for example, 50% of maximum cumulative UE transmit power corresponding to a power class of the UE. In another example implementation, the method 1300 may comprise determining, based on a serving cell of the UE, whether to set the power sharing mode to the static power sharing mode or to indicate that the UE is in the single-uplink operating mode. The processor 510, possibly in combination with the memory 530, may comprise means for determining, based on the serving cell of the UE, whether to the set power sharing mode to the static power sharing mode or to indicate that the UE is in the single-uplink operating mode.

Figure 14:
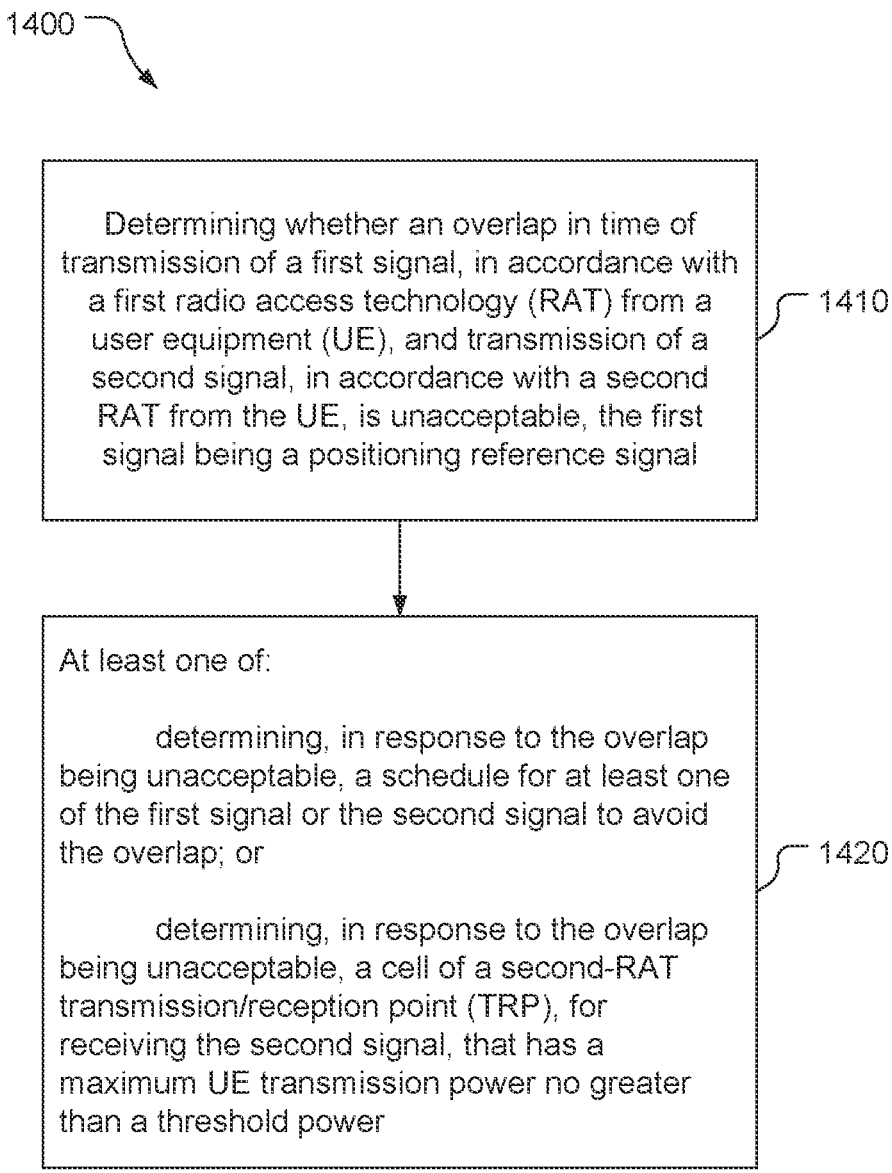
FIG. 14 is a block flow diagram of a method for facilitating positioning.

Referring to FIG. 14, with further reference to FIGS. 1-13, a method 1400 for facilitating positioning includes the stages shown. The method 1400 is, however, an example only and not limiting. The method 1400 may be altered, e.g., by having stages added, removed, rearranged, combined, performed concurrently, and/or having single stages split into multiple stages.

At stage 1410, the method 1400 includes determining whether an overlap in time of transmission of a first signal, in accordance with a first radio access technology (RAT) from a user equipment (UE), and transmission of a second signal, in accordance with a second RAT from the UE, is unacceptable, the first signal being a positioning reference signal. For example, the PRS overlap avoidance unit 660 may determine that a scheduled or on-demand overlap (e.g., partial overlap) of a PRS of a first RAT and a UL signal of a second RAT from the same UE is unacceptable (e.g., whether sufficient power is available for detection of the PRS, or exists at all (e.g., based on the UE being in a single-uplink operating mode, at least with respect to the first RAT and the second RAT)). The PRS overlap avoidance unit 660 may determine whether transmission power that will be available at the UE to transmit the first signal during the overlap will be sufficient for detection of the first signal at a first-RAT TRP. Also or alternatively, the PRS overlap avoidance unit 660 may determine whether a scheduled transmission of the first signal is received by the first-RAT TRP. The processor 610, possibly in combination with the memory 630, possibly in combination with the interface 620 (e.g., a wireless receiver and an antenna), may comprise means for determining whether the overlap is unacceptable.

At stage 1420, the method 1400 includes at least one of: determining, in response to the overlap being unacceptable, a schedule for at least one of the first signal or the second signal to avoid the overlap; or selecting, in response to the overlap being unacceptable, a cell of a second-RAT transmission/reception point (TRP), for receiving the second signal, that has a maximum UE transmission power no greater than a threshold power. For example, in response to an unacceptable scheduled overlap, the PRS overlap avoidance unit 660 may determine an appropriate schedule (of first-RAT signals or second-RAT signals) to avoid the overlap. The processor 610, possibly in combination with the memory 630, may comprise means for determining the schedule. As another example, in response to an unacceptable scheduled or on-demand overlap, the TRP reselection/redirection unit 670 may select a second-RAT TRP cell, to which to transmit the second signal, that has a p-max value less than or equal to a threshold, e.g., to help ensure detection of the PRS. The processor 610, possibly in combination with the memory 630, may comprise means for selecting the cell of the second-RAT TRP.

Implementations of the method 1400 may include one or more of the following features. For example, the method 1400 may include determining the cell of the second-RAT TRP with the threshold power being 20 dBm. The processor 610, possibly in combination with the memory 630, possibly in combination with the interface 620 (e.g., a wireless receiver and an antenna) may comprise means for determining the cell of the second-RAT TRP.

OTHER CONSIDERATIONS

Other examples and implementations are within the scope of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations.

As used herein, the singular forms "a," "an," and "the" include the plural forms as well, unless the context clearly indicates otherwise. The terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

As used herein, unless otherwise stated, a statement that a function or operation is "based on" an item or condition means that the function or operation is based on the stated item or condition and may be based on one or more items and/or conditions in addition to the stated item or condition.

Also, as used herein, "or" as used in a list of items prefaced by "at least one of" or prefaced by "one or more of" indicates a disjunctive list such that, for example, a list of "at least one of A, B. or C," or a list of "one or more of A. B, or C" means A, or B, or C, or AB (A and B), or AC (A and C), or BC (B and C), or ABC (i.e., A and B and C), or combinations with more than one feature (e.g., AA, AAB, ABBC, etc.). Thus, a recitation that an item, e.g., a processor, is configured to perform a function regarding at least one of A or B means that the item may be configured to perform the function regarding A, or may be configured to perform the function regarding B, or may be configured to perform the function regarding A and B. For example, a phrase of "a processor configured to measure at least one of A or B" means that the processor may be configured to measure A (and may or may not be configured to measure B), or may be configured to measure B (and may or may not be configured to measure A), or may be configured to measure A and measure B (and may be configured to select which, or both, of A and B to measure). Similarly, a recitation of a means for measuring at least one of A or B includes means for measuring A (which may or may not be able to measure B), or means for measuring B (and may or may not be configured to measure A), or means for measuring A and B (which may be able to select which, or both, of A and B to measure). As another example, a recitation that an item, e.g., a processor, is configured to at least one of perform function X or perform function Y means that the item may be configured to perform the function X, or may be configured to perform the function Y, or may be configured to perform the function X and to perform the function Y. For example, a phrase of "a processor configured to at least one of measure X or measure Y" means that the processor may be configured to measure X (and may or may not be configured to measure Y), or may be configured to measure Y (and may or may not be configured to measure X), or may be configured to measure X and to measure Y (and may be configured to select which, or both, of X and Y to measure).

Substantial variations may be made in accordance with specific requirements. For example, customized hardware might also be used, and/or particular elements might be implemented in hardware, software (including portable software, such as applets, etc.) executed by a processor, or both. Further, connection to other computing devices such as network input/output devices may be employed. Components, functional or otherwise, shown in the figures and/or discussed herein as being connected or communicating with each other are communicatively coupled unless otherwise noted. That is, they may be directly or indirectly connected to enable communication between them.

The systems and devices discussed above are examples. Various configurations may omit, substitute, or add various procedures or components as appropriate. For instance, features described with respect to certain configurations may be combined in various other configurations. Different aspects and elements of the configurations may be combined in a similar manner. Also, technology evolves and, thus, many of the elements are examples and do not limit the scope of the disclosure or claims.

A wireless communication system is one in which communications are conveyed wirelessly, i.e., by electromagnetic and/or acoustic waves propagating through atmospheric space rather than through a wire or other physical connection. A wireless communication network may not have all communications transmitted wirelessly, but is configured to have at least some communications transmitted wirelessly. Further, the term "wireless communication device," or similar term, does not require that the functionality of the device is exclusively, or evenly primarily, for communication, or that the device be a mobile device, but indicates that the device includes wireless communication capability (one-way or two-way), e.g., includes at least one radio (each radio being part of a transmitter, receiver, or transceiver) for wireless communication.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations provides a description for implementing described techniques. Various changes may be made in the function and arrangement of elements.

The terms "processor-readable medium," "machine-readable medium," and "computer-readable medium," as used herein, refer to any medium that participates in providing data that causes a machine to operate in a specific fashion. Using a computing platform, various processor-readable media might be involved in providing instructions/code to processor(s) for execution and/or might be used to store and/or carry such instructions/code (e.g., as signals). In many implementations, a processor-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

Having described several example configurations, various modifications, alternative constructions, and equivalents may be used. For example, the above elements may be components of a larger system, wherein other rules may take precedence over or otherwise modify the application of the invention. Also, a number of operations may be undertaken before, during, or after the above elements are considered. Accordingly, the above description does not bound the scope of the claims.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

The invention claimed is:

1. A user equipment (UE) comprising:
   a transmitter configured to transmit signals according to a first radio access technology (RAT) and a second RAT respectively;
   a memory; and
   a processor communicatively coupled to the transmitter and the memory and configured to:
      send a first signal via the transmitter in accordance with the first RAT, the first signal being a positioning reference signal;
      send a second signal via the transmitter in accordance with the second RAT; and
      set, in response to initiation of a positioning session and in response to available power for transmission of the first signal for concurrent transmission with the second signal being insufficient for detection of the first signal at a first-RAT TRP (transmission/reception point), a power sharing mode of the UE to a static power sharing mode in which respective fixed amounts of power are allocated to transmission by the UE using the first RAT and the second RAT.

2. The UE of claim 1, wherein the processor is configured to:
   send only the first signal, from among the first signal and the second signal, via the transmitter in response to the first signal and the second signal being scheduled for concurrent transmission and the available power for transmission of the first signal for the concurrent transmission being insufficient for detection of the first signal at the first-RAT TRP; and
   determine whether the available power for transmission of the first signal for the concurrent transmission is more than a pathloss between the first-RAT TRP and the UE in order to determine that the available power for transmission of the first signal for the concurrent transmission is insufficient for detection of the first signal at the first-RAT TRP.

3. The UE of claim 1, wherein the processor is configured to indicate that the UE is in a single-uplink operating mode with respect to the first RAT and the second RAT in response to the initiation of the positioning session and in response to the available power for transmission of the first signal for the concurrent transmission being insufficient for detection of the first signal at the first-RAT TRP.

4. The UE of claim 1, wherein the processor is configured to select a cell of a second-RAT TRP, based on the cell of the second-RAT TRP having a maximum UE transmission power no greater than a threshold power, in response to the initiation of the positioning session and in response to the available power for transmission of the first signal for the concurrent transmission being insufficient for detection of the first signal at the first-RAT TRP.

5. The UE of claim 1, wherein the processor is configured to select a cell of a second-RAT TRP for receiving the second signal, based on the cell of the second-RAT TRP having a maximum UE transmission power no greater than a threshold power, and in response to the initiation of the positioning session and a priority level of the positioning session.

6. The UE of claim 1, wherein the processor is configured to at least one of:
   set, in response to the initiation of the positioning session, the power sharing mode of the UE to the static power sharing mode; or
   indicate that the UE is in a single-uplink operating mode with respect to the first RAT and the second RAT in response to the initiation of the positioning session; or
   select, in response to the initiation of the positioning session, a cell of a second-RAT TRP for receiving the second signal, based on the cell of the second-RAT TRP having a maximum UE transmission power no greater than a first threshold power;
   in response to the available power for transmission of the first signal for the concurrent transmission being below a second threshold power that is equal to a transmit power, determined in accordance with a power control equation, minus a third threshold power.

7. The UE of claim 6, wherein the second threshold power is 50% of a maximum transmit power corresponding to a power class of the UE.

8. The UE of claim 1, wherein the processor is configured to:
   indicate, in response to the initiation of the positioning session, that the UE is in a single-uplink operating mode with respect to the first RAT and the second RAT; and
   select which of setting the power sharing mode of the UE to the static power sharing mode or indicating that the UE is in the single-uplink operating mode to perform based on a serving cell of the UE.

9. A user equipment (UE) comprising:
   means for sending a first signal in accordance with a first radio access technology (RAT), the first signal being a positioning reference signal;
   means for sending a second signal in accordance with a second RAT; and
   means for setting, in response to initiation of a positioning session and in response to available power for transmission of the first signal for concurrent transmission with the second signal being insufficient for detection of the first signal at a first-RAT TRP (transmission/reception point), a power sharing mode of the UE to a static power sharing mode in which respective fixed amounts of power are allocated to transmission by the UE using the first RAT and the second RAT.

10. The UE of claim 9, further comprising:
    means for sending only the first signal, from among the first signal and the second signal, in response to the first signal and the second signal being scheduled for concurrent transmission and the available power for transmission of the first signal for the concurrent transmission being insufficient for detection of the first signal at the first-RAT TRP; and
    means for determining whether the available power for transmission of the first signal for the concurrent transmission is more than a pathloss between the first-RAT TRP and the UE in order to determine that the available power for transmission of the first signal for the concurrent transmission is insufficient for detection of the first signal at the first-RAT TRP.

11. The UE of claim 9, further comprising means for indicating that the UE is in a single-uplink operating mode with respect to the first RAT and the second RAT in response to the initiation of the positioning session and in response to the available power for transmission of the first signal for the concurrent transmission being insufficient for detection of the first signal at the first-RAT TRP.

12. The UE of claim 9, further comprising means for selecting a cell of a second-RAT TRP, based on the cell of the second-RAT TRP having a maximum UE transmission power no greater than a threshold power, in response to the initiation of the positioning session and in response to the available power for transmission of the first signal for the concurrent transmission being insufficient for detection of the first signal at the first-RAT TRP.

13. The UE of claim 9, further comprising means for selecting a cell of a second-RAT TRP for receiving the second signal, based on the cell of the second-RAT TRP having a maximum UE transmission power no greater than a threshold power, and in response to the initiation of the positioning session and a priority level of the positioning session.

14. The UE of claim 9, wherein at least one of:
the means for setting are for setting the power sharing mode to the static power sharing mode in response to the available power for transmission of the first signal for the concurrent transmission being below a second threshold power that is equal to a transmit power, determined in accordance with a power control equation, minus a third threshold power; or
the UE includes means for indicating that the UE is in a single-uplink operating mode with respect to the first RAT and the second RAT in response to the initiation of the positioning session and in response to the available power for transmission of the first signal for the concurrent transmission being below the second threshold power; or
the UE includes means for selecting, in response to the initiation of the positioning session, a cell of a second-RAT TRP for receiving the second signal, based on the cell of the second-RAT TRP having a maximum UE transmission power no greater than a first threshold power, wherein the means for selecting are for selecting the cell of the second-RAT TRP in response to the available power for transmission of the first signal for the concurrent transmission being below the second threshold power.

15. The UE of claim 14, wherein the second threshold power is 50% of a maximum transmit power corresponding to a power class of the UE.

16. The UE of claim 9, further comprising:
means for indicating, in response to the initiation of the positioning session, that the UE is in a single-uplink operating mode with respect to the first RAT and the second RAT; and
means for determining, based on a serving cell of the UE, whether to set the power sharing mode or to indicate that the UE is in the single-uplink operating mode.

17. A method at a user equipment (UE) for controlling uplink signal transmission, the method comprising:
sending a first signal in accordance with a first radio access technology (RAT), the first signal being a positioning reference signal; and setting, in response to initiation of a positioning session and in response to available power for transmission of the first signal for concurrent transmission with a second signal being insufficient for detection of the first signal at a first-RAT TRP (transmission/reception point), a power sharing mode of the UE to a static power sharing mode in which respective fixed amounts of power are allocated to transmission by the UE using the first RAT and a second RAT.

18. The method of claim 17, further comprising:
inhibiting transmission of the second signal, in accordance with the second RAT, in response to the first signal and the second signal being scheduled for concurrent transmission and the available power for transmission of the first signal for the concurrent transmission being insufficient for detection of the first signal at the first-RAT TRP; and
determining that the available power for transmission of the first signal for the concurrent transmission is less than a pathloss between the first-RAT TRP and the UE in order to determine that the available power for transmission of the first signal for the concurrent transmission is insufficient for detection of the first signal at the first-RAT TRP.

19. The method of claim 17, further comprising indicating that the UE is in a single-uplink operating mode with respect to the first RAT and the second RAT in response to the initiation of the positioning session and in response to the available power for transmission of the first signal for the concurrent transmission being insufficient for detection of the first signal at the first-RAT TRP.

20. The method of claim 17, further comprising selecting a cell of a second-RAT TRP, based on the cell of the second-RAT TRP having a maximum UE transmission power no greater than a threshold power in response to the initiation of the positioning session and in response to the available power for transmission of the first signal for the concurrent transmission being insufficient for detection of the first signal at the first-RAT TRP.

21. The method of claim 17, further comprising selecting a cell of a second-RAT TRP for receiving the second signal, based on the cell of the second-RAT TRP having a maximum UE transmission power no greater than a threshold power, and in response to the initiation of the positioning session and a priority level of the positioning session.

22. The method of claim 17, wherein the method comprises at least one of:
setting the power sharing mode to the static power sharing mode in response to the available power for transmission of the first signal for the concurrent transmission being below a second threshold power that is equal to a transmit power, determined in accordance with a power control equation, minus a third threshold power; or
indicating that the UE is in a single-uplink operating mode with respect to the first RAT and the second RAT in response to the initiation of the positioning session and in response to the available power for transmission of the first signal for the concurrent transmission being below the second threshold power; or
selecting, in response to the initiation of the positioning session, a cell of a second-RAT TRP for receiving the second signal, based on the cell of the second-RAT TRP having a maximum UE transmission power no greater than a first threshold power and in response to the available power for transmission of the first signal for the concurrent transmission being below the second threshold power.

23. The method of claim 22, wherein the second threshold power is 50% of a maximum transmit power corresponding to a power class of the UE.

24. The method of claim 17, wherein the method comprises determining, based on a serving cell of the UE, whether to set the power sharing mode to the static power sharing mode or to indicate that the UE is in a single-uplink operating mode with respect to the first RAT and the second RAT.

25. A non-transitory, processor-readable storage medium comprising processor-readable instructions configured to cause a processor, for controlling uplink signal transmission from a user equipment (UE), to:
send a first signal in accordance with a first radio access technology (RAT), the first signal being a positioning reference signal; and
set, in response to initiation of a positioning session and in response to available power for transmission of the first signal for concurrent transmission with a second signal being insufficient for detection of the first signal at a first-RAT TRP (transmission/reception point), a power sharing mode of the UE to a static power sharing mode in which respective fixed amounts of power are allocated to transmission by the UE using the first RAT and a second RAT.

26. The storage medium of claim 25, further comprising processor-readable instructions configured to cause the processor to:
inhibit transmission of the second signal, in accordance with the second RAT, in response to the first signal and the second signal being scheduled for concurrent transmission and the available power for transmission of the first signal for the concurrent transmission being insufficient for detection of the first signal at the first-RAT TRP; and
determine that the available power for transmission of the first signal for the concurrent transmission is less than a pathloss between the first-RAT TRP and the UE in order to determine that the available power for transmission of the first signal for the concurrent transmission is insufficient for detection of the first signal at the first-RAT TRP.

27. The storage medium of claim 25, further comprising processor-readable instructions configured to cause the processor to indicate that the UE is in a single-uplink operating mode with respect to the first RAT and the second RAT in response to the initiation of the positioning session and in response to the available power for transmission of the first signal for the concurrent transmission being insufficient for detection of the first signal at the first-RAT TRP.

28. The storage medium of claim 25, further comprising processor-readable instructions configured to cause the processor to select a cell of a second-RAT TRP, based on the cell of the second-RAT TRP having a maximum UE transmission power no greater than a threshold power in response to the initiation of the positioning session and in response to the available power for transmission of the first signal for the concurrent transmission being insufficient for detection of the first signal at the first-RAT TRP.

29. The storage medium of claim 25, further comprising processor-readable instructions configured to cause the processor to select a cell of a second-RAT TRP for receiving the second signal, based on the cell of the second-RAT TRP having a maximum UE transmission power no greater than a threshold power, and in response to the initiation of the positioning session and a priority level of the positioning session.

30. The storage medium of claim 25, wherein the instructions comprise instructions configured to cause the processor to at least one of:
set the power sharing mode to the static power sharing mode in response to the available power for transmission of the first signal for the concurrent transmission being below a second threshold power that is equal to a transmit power, determined in accordance with a power control equation, minus a third threshold power; or
indicate that the UE is in a single-uplink operating mode with respect to the first RAT and the second RAT in response to the initiation of the positioning session and in response to the available power for transmission of the first signal for the concurrent transmission being below the second threshold power; or
select, in response to the initiation of the positioning session, a cell of a second-RAT TRP for receiving the second signal, based on the cell of the second-RAT TRP having a maximum UE transmission power no greater than a first threshold power and in response to the available power for transmission of the first signal for the concurrent transmission being below the second threshold power.

31. The storage medium of claim 30, wherein the second threshold power is 50% of a maximum transmit power corresponding to a power class of the UE.

32. The storage medium of claim 25, wherein the instructions comprise instructions configured to cause the processor to determine, based on a serving cell of the UE, whether to set the power sharing mode to the static power sharing mode or to indicate that the UE is in a single-uplink operating mode with respect to the first RAT and the second RAT.

33. A network entity comprising:
a memory; and
a processor communicatively coupled to the memory and configured to:
determine whether an overlap in time of transmission of a first signal, in accordance with a first radio access technology (RAT) from a user equipment (UE), and transmission of a second signal, in accordance with a second RAT from the UE, is unacceptable, the first signal being a positioning reference signal; and
at least one of:
determine, in response to the overlap being unacceptable, a schedule for at least one of the first signal or the second signal to avoid the overlap; or
determine, in response to the overlap being unacceptable, a cell of a second-RAT transmission/reception point (TRP), for receiving the second signal, that has a maximum UE transmission power no greater than a threshold power;
wherein to determine whether the overlap is unacceptable, the processor is configured to determine whether transmission power that will be available at the UE to transmit the first signal during the overlap will be sufficient for detection of the first signal at a first-RAT TRP, or the processor is configured to determine whether the UE is in a single-uplink operating mode with respect to the first RAT and the second RAT, or a combination thereof.

34. The network entity of claim 33, wherein to determine whether the overlap is unacceptable, the processor is configured to determine whether a scheduled transmission of the first signal is received by a first-RAT TRP.

35. The network entity of claim 33, wherein the processor is configured to determine the cell of the second-RAT TRP, and wherein the threshold power is 20 dBm.

36. A network entity comprising:
   overlap determining means for determining whether an overlap in time of transmission of a first signal, in accordance with a first radio access technology (RAT) from a user equipment (UE), and transmission of a second signal, in accordance with a second RAT from the UE, is unacceptable, the first signal being a positioning reference signal; and
   at least one of:
     schedule means for determining, in response to the overlap being unacceptable, a schedule for at least one of the first signal or the second signal to avoid the overlap; or
     selecting means for selecting, in response to the overlap being unacceptable, a cell of a second-RAT transmission/reception point (TRP), for receiving the second signal, that has a maximum UE transmission power no greater than a threshold power;
   wherein the overlap determining means comprise means for determining whether transmission power that will be available at the UE to transmit the first signal during the overlap will be sufficient for detection of the first signal at a first-RAT TRP, or comprise means for determining whether the UE is in a single-uplink operating mode with respect to the first RAT and the second RAT, or a combination thereof.

37. The network entity of claim 36, wherein the overlap determining means comprise means for determining whether a scheduled transmission of the first signal is received by a first-RAT TRP.

38. The network entity of claim 36, wherein the network entity comprises the selecting means, and wherein the threshold power is 20 dBm.

39. A method at a network entity for facilitating positioning, the method comprising:
   determining whether an overlap in time of transmission of a first signal, in accordance with a first radio access technology (RAT) from a user equipment (UE), and transmission of a second signal, in accordance with a second RAT from the UE, is unacceptable, the first signal being a positioning reference signal; and
   at least one of:
     determining, in response to the overlap being unacceptable, a schedule for at least one of the first signal or the second signal to avoid the overlap; or
     determining, in response to the overlap being unacceptable, a cell of a second-RAT transmission/reception point (TRP), for receiving the second signal, that has a maximum UE transmission power no greater than a threshold power;
   wherein determining whether the overlap is unacceptable comprises determining whether transmission power that will be available at the UE to transmit the first signal during the overlap will be sufficient for detection of the first signal at a first-RAT TRP, or comprises determining whether the UE is in a single-uplink operating mode with respect to the first RAT and the second RAT, or a combination thereof.

40. The network entity of claim 39, wherein determining whether the overlap is unacceptable comprises determining whether a scheduled transmission of the first signal is received by a first-RAT TRP.

41. The network entity of claim 39, wherein the method comprises determining the cell of the second-RAT TRP, and wherein the threshold power is 20 dBm.

42. A non-transitory, processor-readable storage medium comprising processor-readable instructions configured to cause a processor, for facilitating positioning, to:
   determine whether an overlap in time of transmission of a first signal, in accordance with a first radio access technology (RAT) from a user equipment (UE), and transmission of a second signal, in accordance with a second RAT from the UE, is unacceptable, the first signal being a positioning reference signal; and
   at least one of:
     determine, in response to the overlap being unacceptable, a schedule for at least one of the first signal or the second signal to avoid the overlap; or
     determine, in response to the overlap being unacceptable, a cell of a second-RAT transmission/reception point (TRP), for receiving the second signal, that has a maximum UE transmission power no greater than a threshold power
   wherein the instructions configured to cause the processor to determine whether the overlap is unacceptable comprise instructions configured to cause the processor to determine whether transmission power that will be available at the UE to transmit the first signal during the overlap will be sufficient for detection of the first signal at a first-RAT TRP, or comprise instructions configured to cause the processor to determine whether the UE is in a single-uplink operating mode with respect to the first RAT and the second RAT, or a combination thereof.

43. The storage medium of claim 42, wherein the instructions configured to cause the processor to determine whether the overlap is unacceptable comprise instructions configured to cause the processor to determine whether a scheduled transmission of the first signal is received by a first-RAT TRP.

44. The storage medium of claim 42, wherein the storage medium comprises instructions configured to cause the processor to determine the cell of the second-RAT TRP, and wherein the threshold power is 20 dBm.

* * * * *